(12) United States Patent
Yokomakura et al.

(10) Patent No.: US 10,624,065 B2
(45) Date of Patent: Apr. 14, 2020

(54) TERMINAL DEVICE, BASE STATION DEVICE, INTEGRATED CIRCUIT, AND COMMUNICATION METHOD

(71) Applicant: SHARP KABUSHIKI KAISHA, Sakai, Osaka (JP)

(72) Inventors: Kazunari Yokomakura, Sakai (JP); Tatsushi Aiba, Sakai (JP); Shoichi Suzuki, Sakai (JP); Hiroki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 5 days.

(21) Appl. No.: 15/564,190

(22) PCT Filed: Jan. 27, 2016

(86) PCT No.: PCT/JP2016/052291
§ 371 (c)(1),
(2) Date: Oct. 3, 2017

(87) PCT Pub. No.: WO2016/121803
PCT Pub. Date: Aug. 4, 2016

(65) Prior Publication Data
US 2018/0132218 A1 May 10, 2018

(30) Foreign Application Priority Data
Jan. 29, 2015 (JP) .................................. 2015-014991

(51) Int. Cl.
*H04W 4/00* (2018.01)
*H04W 72/04* (2009.01)
(Continued)

(52) U.S. Cl.
CPC ......... *H04W 72/0406* (2013.01); *H04L 5/001* (2013.01); *H04W 28/06* (2013.01); *H04W 72/042* (2013.01); *H04L 5/0053* (2013.01)

(58) Field of Classification Search
CPC .......................... H04W 72/0406; H04W 28/06
(Continued)

(56) References Cited

U.S. PATENT DOCUMENTS

| | | | |
|---|---|---|---|
| 8,538,411 B2 * | 9/2013 | Kwon | H04W 28/06 455/422.1 |
| 8,995,381 B2 * | 3/2015 | Dinan | H04W 72/0406 370/329 |

(Continued)

FOREIGN PATENT DOCUMENTS

JP      2013-509791 A     3/2013

OTHER PUBLICATIONS

New WI proposal: LTE Carrier Aggregation Enhancement Beyond 5 Carriers,RP-142286, Nokia Corporation, NTT DoCoMo Inc., Nokia Networks, 3GPP TSGRAN Meeting #66, Hawaii, United States of America, Dec. 8-11, 2014.

*Primary Examiner* — Marceau Milord
(74) *Attorney, Agent, or Firm* — ScienBiziP, P.C.

(57) ABSTRACT

A terminal device configured to communicate with a base station device includes: a reception unit configured to receive information indicating that more than five downlink carriers are configured, and information indicating the number of cells in which the terminal device is capable of simultaneously monitoring physical downlink control channels; and a monitoring unit configured to monitor physical downlink control channels of only cells specified by the information indicating the number of cells in which the terminal device is capable of simultaneously monitoring physical downlink control channels.

6 Claims, 13 Drawing Sheets

US 10,624,065 B2
Page 2

(51) Int. Cl.
*H04L 5/00* (2006.01)
*H04W 28/06* (2009.01)

(58) Field of Classification Search
USPC ............ 455/422.1, 450, 452.1, 456.1, 562.1
See application file for complete search history.

(56) References Cited

U.S. PATENT DOCUMENTS

| | | | | |
|---|---|---|---|---|
| 9,131,482 B2 * | 9/2015 | Kwon | ................... | H04W 28/06 |
| 9,265,034 B2 * | 2/2016 | Kwon | ................... | H04W 28/06 |
| 9,392,582 B2 * | 7/2016 | Kwon | ................... | H04W 28/06 |
| 9,591,631 B2 * | 3/2017 | You | ......................... | H04L 5/001 |
| 9,763,203 B2 * | 9/2017 | Dinan | ................ | H04W 52/346 |
| 9,769,772 B2 * | 9/2017 | Dinan | ................ | H04W 52/346 |
| 9,769,828 B2 * | 9/2017 | Kaushik | ............... | H04W 72/046 |
| 9,769,838 B2 * | 9/2017 | You | ......................... | H04L 5/001 |
| 9,820,283 B2 * | 11/2017 | Dinan | .............. | H04W 72/0473 |
| 9,844,006 B2 * | 12/2017 | Dinan | ................ | H04W 52/146 |
| 9,867,137 B2 * | 1/2018 | Dinan | ................. | H04B 7/2618 |
| 2011/0105107 A1 * | 5/2011 | Kwon | ................... | H04W 28/06 |
| | | | | 455/422.1 |
| 2011/0305290 A1 * | 12/2011 | Kim | ...................... | H04L 5/0007 |
| | | | | 375/267 |
| 2012/0178445 A1 * | 7/2012 | Dalsgaard | ............ | H04W 72/02 |
| | | | | 455/434 |
| 2013/0148613 A1 * | 6/2013 | Han | ...................... | H04L 1/0026 |
| | | | | 370/329 |
| 2013/0279433 A1 * | 10/2013 | Dinan | ................ | H04W 52/146 |
| | | | | 370/329 |
| 2013/0329673 A1 * | 12/2013 | Kwon | ................... | H04W 28/06 |
| | | | | 370/329 |
| 2014/0036664 A1 * | 2/2014 | Han | ........................ | H04W 4/70 |
| | | | | 370/230 |
| 2014/0056243 A1 * | 2/2014 | Pelletier | ................ | H04W 74/04 |
| | | | | 370/329 |
| 2014/0094410 A1 * | 4/2014 | Kaplan | ................. | A61L 27/227 |
| | | | | 514/9.1 |
| 2014/0334419 A1 * | 11/2014 | Yang | ..................... | H04L 1/1861 |
| | | | | 370/329 |
| 2015/0130568 A1 * | 5/2015 | Wang | ................... | H01H 50/021 |
| | | | | 335/142 |
| 2015/0245344 A1 * | 8/2015 | You | ......................... | H04J 11/00 |
| | | | | 370/280 |
| 2015/0312937 A1 * | 10/2015 | Suzuki | .............. | H04W 72/0446 |
| | | | | 370/255 |
| 2016/0050667 A1 * | 2/2016 | Papasakellariou | ......................... | |
| | | | | H04W 74/0808 |
| | | | | 370/329 |
| 2016/0323865 A1 * | 11/2016 | Kwon | ................... | H04W 28/06 |
| 2017/0215172 A1 * | 7/2017 | Yang | ........................ | H04B 7/26 |
| 2018/0007709 A1 * | 1/2018 | Seo | ........................... | H04L 1/00 |
| 2018/0027483 A1 * | 1/2018 | You | ........................ | H04L 5/0053 |
| | | | | 370/336 |

\* cited by examiner

TERMINAL DEVICE, BASE STATION DEVICE, INTEGRATED CIRCUIT, AND COMMUNICATION METHOD

TECHNICAL FIELD

The present invention relates to a terminal device, a base station device, an integrated circuit, and a communication method.

This application claims priority based on Japanese Patent Application No. 2015-014991 filed on Jan. 29, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been studied. In LTE, a base station device is also referred to as an evolved NodeB (eNodeB), and a terminal device is also referred to as user equipment (UE). LTE is a cellular communication system in which an area is divided into multiple cells to form a cellular pattern, each of the cells being served by a base station device. A single base station device may manage multiple cells.

LTE supports a time division duplex (TDD). LTE that employs a TDD scheme is also referred to as TD-LTE or LTE TDD. Uplink signals and downlink signals are time division multiplexed in TDD. LTE also supports a frequency division duplex (FDD).

In 3GPP, career aggregation has been specified which allows a terminal device to perform simultaneous transmission and/or reception in up to five serving cells (component careers).

In 3GPP, a configuration where a terminal device performs simultaneous transmission and/or reception in more than five serving cells (component careers) has been considered (NPL 1). Furthermore, a configuration where a terminal device transmits a physical uplink control channel in a secondary cell which is a serving cell other than a primary cell has been considered (NPL 1).

CITATION LIST

Non-Patent Literature

NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

DISCLOSURE OF THE INVENTION

Problems to be Solved by the Invention

However, for the above-described radio systems, a concrete method when transmitting downlink control information has not been sufficiently discussed.

The present invention provides a terminal device, an integrated circuit mounted on the terminal device, a communication method used by the terminal device, a base station device, an integrated circuit mounted on the base station device, and a communication method used by the base station device that allow downlink control information to be transmitted efficiently.

Means for Solving the Problems (1) A terminal device according to one aspect of the present invention is a terminal device including: a reception unit configured to receive information indicating that more than five downlink carriers are configured and information indicating the number of cells in which the terminal device is capable of simultaneously monitoring physical downlink control channels; and a monitoring unit configured to monitor physical downlink control channels of cells specified by the information indicating the number of cells in which the terminal device is capable of simultaneously monitoring physical downlink control channels.

(2) A terminal device according to one aspect of the present invention is a terminal device including: a reception unit configured to receive information indicating that more than five downlink carriers are configured and information indicating the number of downlink cells capable of being activated simultaneously; a medium access control (MAC) layer processing unit configured to activate downlink cells in accordance with the information indicating the number of downlink cells capable of being activated simultaneously; and a monitoring unit configured to monitor physical downlink control channels of cells activated by the medium access control (MAC) layer processing unit.

(3) A base station device according to one aspect of the present invention is a base station device including: a transmission unit configured to transmit information indicating that more downlink carriers are configured and information indicating the number of cells in which a terminal device is capable of simultaneously monitoring physical downlink control channels; and a physical downlink control channel transmission unit configured to transmit physical downlink control channels of cells specified by the information indicating the number of cells in which the terminal device is capable of simultaneously monitoring physical downlink control channels.

(4) A base station device according to one aspect of the present invention is a base station device including: a transmission unit configured to transmit information indicating that more than five downlink carriers are configured and information indicating the number of downlink cells capable of being activated simultaneously; a medium access control (MAC) layer processing unit configured to activate downlink cells in accordance with the information indicating the number of downlink cells capable of being activated simultaneously; and a physical downlink control channel transmission unit configured to transmit physical downlink control channels of cells activated by the medium access control (MAC) layer processing unit.

(5) A communication method according to one aspect of the present invention is a communication method for a terminal device. The communication method includes the steps of: receiving information indicating that more than five downlink carriers are configured and information indicating the number of cells in which the terminal device is capable of simultaneously monitoring physical downlink control channels; and monitoring physical downlink control channels of cells specified by the information indicating the number of cells in which the terminal device is capable of simultaneously monitoring physical downlink control channels.

(6) A terminal device according to one aspect of the present invention is a communication method for a terminal device. The communication method includes the steps of: receiving information indicating that more than five downlink carriers are configured and information indicating the number of downlink cells capable of being activated simultaneously; activating downlink cells in accordance with the information indicating the number of downlink cells capable of being activated simultaneously; and monitoring physical downlink control channels of the activated cells.

(7) A communication method according to one aspect of the present invention is a communication method for a base station device. The communication method includes the steps of: transmitting information indicating that more than five downlink carriers are configured and information indicating the number of cells in which a terminal device is capable of simultaneously monitoring physical downlink control channels; and transmitting physical downlink control channels of cells specified by the information indicating the number of cells in which the terminal device is capable of simultaneously monitoring physical downlink control channels.

(8) A communication method according to one aspect of the present invention is a communication method for a base station device. The communication method includes the steps of: transmitting information indicating that more downlink carriers are configured and information indicating the number of downlink cells capable of being activated simultaneously; activating downlink cells in accordance with the information indicating the number of downlink cells capable of being activated simultaneously; and transmitting physical downlink control channels of the activated cells.

(9) An integrated circuit according to one aspect of the present invention is an integrated circuit mounted on a terminal device. The integrated circuit causes the terminal device to exert the functions of: receiving information indicating that more than five downlink carriers are configured and information indicating the number of cells in which the terminal device is capable of simultaneously monitoring physical downlink control channels; and monitoring physical downlink control channels of cells specified by the information indicating the number of cells in which the terminal device is capable of simultaneously monitoring physical downlink control channels.

(10) An integrated circuit according to one aspect of the present invention is an integrated circuit mounted on a terminal device. The integrated circuit causes the terminal device to exert the functions of: receiving information indicating that more than five downlink carriers are configured and information indicating the number of downlink cells capable of being activated simultaneously; activating downlink cells in accordance with the information indicating the number of downlink cells capable of being activated simultaneously, and monitoring only physical downlink control channels of the activated cells.

(11) An integrated circuit according to one aspect of the present invention is an integrated circuit mounted on a base station device. The integrated circuit causes the base station device to exert the functions of: transmitting information indicating that more than five downlink carriers are configured and information indicating the number of cells in which a terminal device is capable of simultaneously monitoring physical downlink control channels; and transmitting physical downlink control channels of cells specified by the information indicating the number of cells in which the terminal device is capable of simultaneously monitoring physical downlink control channels.

(12) An integrated circuit according to one aspect of the present invention is an integrated circuit mounted on a base station device. The integrated circuit causes the base station device 3 to exert the functions of: transmitting information indicating that more than five downlink carriers are configured and information indicating the number of downlink cells capable of being activated simultaneously; activating downlink cells in accordance with the information indicating the number of downlink cells capable of being activated simultaneously, and transmitting physical downlink control channels of the activated cells.

Effects of the Invention

According to the present invention, downlink control information can be executed efficiently.

MODE FOR CARRYING OUT THE INVENTION

Embodiments of the present invention will be described below.

Figure 1:
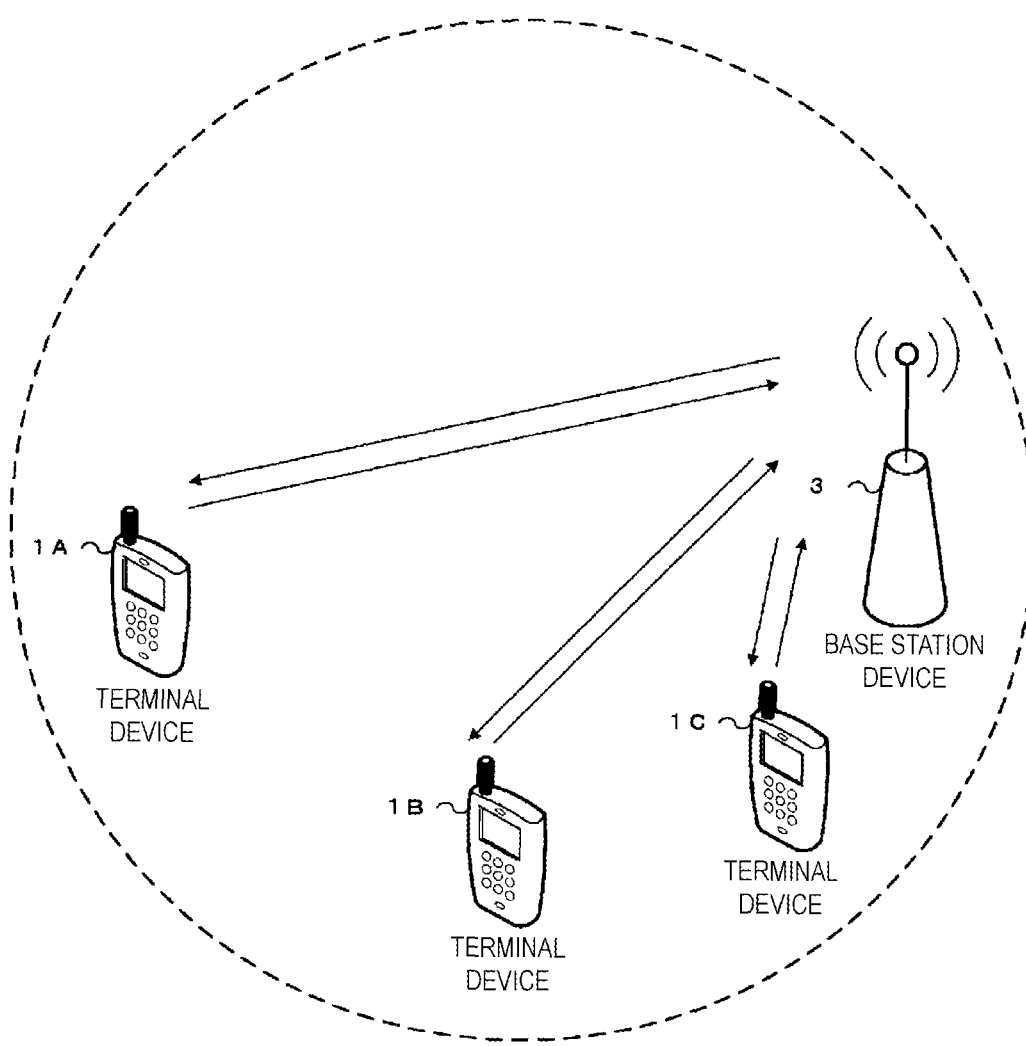
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. The terminal devices 1A to 1C are each referred to as a terminal device 1 below.

Carrier aggregation will be described below.

In the present embodiment, multiple serving cells are configured for the terminal device 1. A technology in which the terminal device 1 communicates via the multiple cells is referred to as cell aggregation or carrier aggregation. The present invention may be applied to each of the multiple serving cells configured for the terminal device 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells.

Time division duplex (TDD) and/or frequency division duplex (FDD) is applied to a radio communication system according to the present embodiment. For cell aggregation, TDD may be applied to all of the multiple serving cells. Alternatively, serving cells to which TDD is applied and serving cells to which FDD is applied may be aggregated.

The configured multiple serving cells include one primary cell and one or multiple secondary cells. The primary cell is a serving cell in which an initial connection establishment procedure has been performed, a serving cell in which a connection re-establishment procedure has been started, or a cell indicated as a primary cell during a handover procedure. At a point in time when a radio resource control (RRC) connection is established, or later, a secondary cell may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 can perform simultaneous transmission and/or reception on multiple physical channels in multiple serving cells (component careers). A single physical channel is transmitted in a single serving cell (component carrier) of the multiple serving cells (component carriers).

In the present embodiment, a secondary cell used for transmission of a physical uplink control channel (PUCCH) is referred to as a special secondary cell or a PUCCH secondary cell. In the present embodiment, a secondary cell not used for the transmission of the PUCCH is referred to as a non-special secondary cell, a non-PUCCH secondary cell, a non-PUCCH serving cell, or a non-PUCCH cell. The primary cell and the special secondary cell is collectively referred to as a PUCCH serving cell or a PUCCH cell.

The PUCCH serving cell (the primary cell, the PUCCH secondary cell) includes the downlink component carrier and the uplink component carrier. A resource for PUCCH is configured in the PUCCH serving cell (the primary cell, the PUCCH secondary cell).

The non-PUCCH serving cell (non-PUCCH secondary cell) may include only the downlink component carrier. The non-PUCCH serving cell (non-PUCCH secondary cell) may include the downlink component carrier and the uplink component carrier.

The terminal device 1 performs transmission on the PUCCH in the PUCCH serving cell. The terminal device 1 performs transmission on the PUCCH in the primary cell. The terminal device 1 performs transmission on the PUCCH in the special secondary cell. The terminal device 1 does not perform transmission on the PUCCH in the non-special secondary cell.

Note that the special secondary cell may be defined as a serving cell other than the primary cell or the secondary cell.

Physical channels and physical signals according to the present embodiment will be described.

In FIG. 1, uplink radio communication from the terminal device 1 to the base station device 3 uses the following uplink physical channels. The uplink physical channels are used to transmit information output from a higher layer.

Physical uplink control channel (PUCCH)
Physical uplink shared channel (PUSCH)
Physical random access channel (PRACH)

The PUCCH is used to transmit uplink control information (UCI). The uplink control information includes: downlink channel state information (CSI): a scheduling request (SR) indicating a request for a PUSCH resource; and a hybrid automatic repeat request acknowledgement (HARQ-ACK) for downlink data (a transport block, a medium access control protocol data unit (MAC PDU), a downlink-shared channel (DL-SCH), or a physical downlink shared channel (PDSCH)). The HARQ-ACK indicates an acknowledgement (ACK) or a negative-acknowledgement (NACK). The HARQ-ACK is also referred to as ACK/NACK, HARQ feedback, HARQ acknowledge, HARQ information, or HARQ control information.

The PUSCH is used to transmit uplink data (uplink-shared channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is used to transmit a random access preamble. The PRACH is used for the initial connection establishment procedure, the handover procedure, the connection re-establishment procedure, synchronization (timing adjustment) for uplink transmission, and the request for the PUSCH resource.

In FIG. 1, the following uplink physical signal is used in the uplink radio communication. The uplink physical signal is not used to transmit information output from the higher layer, but is used by a physical layer.

Uplink reference signal (UL RS)

According to the present embodiment, the following two types of uplink reference signals are used.

Demodulation reference signal (DMRS)
Sounding reference signal (SRS)

The DMRS relates to transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. The downlink physical channels are used to transmit the information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB), or a broadcast channel (BCH), that is shared by the terminal devices 1.

The PCFICH is used to transmit information indicating a region (OFDM symbols) to be used for transmission of the PDCCH.

The PHICH is used to transmit an HARQ indicator (HARQ feedback or response information) indicating an acknowledgement (ACK) or a negative acknowledgement (NACK) with respect to the uplink data (uplink shared channel (UL-SCH)) received by the base station device 3.

The PDCCH and the EPDCCH are used to transmit downlink control information (DCI). The downlink control information is also referred to as a DCI format. The downlink control information includes DCI format 3, DCI format 3A, a downlink grant and an uplink grant. The downlink grant is also referred to as downlink assignment or downlink allocation.

The downlink grant is used for scheduling of a single PDSCH within a single cell. The downlink grant is used for scheduling of the PDSCH within the same subframe as the subframe in which the downlink grant is transmitted.

The uplink grant is used for scheduling of a single PUSCH within a single cell. The uplink grant is used for scheduling of a single PUSCH within the fourth or later subframe from the subframe in which the uplink grant is transmitted.

The uplink grant includes a TPC command for the PUSCH.

CRC parity bits added to the downlink grant or the uplink grant are scrambled with an RNTI. Specifically, the cyclic redundancy check (CRC) parity bits are added to the downlink grant or the uplink grant, and after the addition, the CRC parity bits are scrambled with the RNTI. Here, the CRC parity bits added to the downlink grant or the uplink grant may be obtained from a payload of the DCI format.

The terminal device 1 attempts to decode the DCI format to which the CRC parity bits scrambled with the RNTI have been added, and detects the DCI format for which the CRC is succeeded, as a DCI format addressed to the terminal device 1 itself (also referred to as blind decoding). In other words, the terminal device 1 detects the PDCCH with the CRC scrambled with the RNTI. The terminal device 1 detects the PDCCH with the DCI format to which the CRC parity bits scrambled with the RNTI have been added.

The RNTI includes a cell-radio network temporary identifier (C-RNTI). The C-RNTI is an identifier unique to the terminal device 1 and used for identification of an RRC connection and scheduling. The C-RNTI is used for unicast transmission scheduled dynamically.

The RNTI also includes a semi-persistent scheduling C-RNTI (SPS C-RNTI). The SPS C-RNTI is an identifier unique to the terminal device 1 and used for semi-persistent scheduling. The SPS C-RNTI is used for unicast transmission scheduled semi-persistently.

The RNTI further includes a random access RNTI (RA-RNTI). The RA-RNTI is an identifier used for transmission of a random access response message. In other words, the RA-RNTI is used for the transmission of the random access response message in a random access procedure. For example, the terminal device 1 monitors the PDCCH with the CRC scrambled with the RA-RNTI after the transmission of a random access preamble. The terminal device 1 receives a random access response on the PDSCH in accordance with detection of the PDCCH with the CRC scrambled with the RA-RNTI.

The RNTI further includes a paging RNTI (P-RNTI). The P-RNTI is an identifier used for paging and notification of system information modification. For example, the P-RNTI is used for paging and transmission of a system information message. The terminal device 1 receives paging on the PDSCH in accordance with detection of the PDCCH with the CRC scrambled with the P-RNTI.

The RNTI further includes a system information RNTI (SI-RNTI). The SI-RNTI is an identifier used for broadcast of the system information. For example, the SI-RNTI is used for transmission of the system information message. The terminal device 1 receives the system information message on the PDSCH in accordance with detection of the PDCCH with the CRC scrambled with the SI-RNTI.

The RNTI further includes a temporary C-RNTI. The temporary C-RNTI is an identifier used in a random access procedure. For example, the temporary C-RNTI can be applied to a contention based random access procedure. The temporary C-RNTI can be applied when a valid C-RNTI is not available. For example, the terminal device 1 performs reception on the PDSCH in accordance with detection of the PDCCH with the CRC scrambled with the temporary C-RNTI.

The PDSCH is used to transmit downlink data (downlink shared channel (DL-SCH)). The DL-SCH is a transport channel. In other words, the DL-SCH transmitted on the PDSCH is the transport channel associated with the PDCCH and/or the RNTI.

The PMCH is used to transmit multicast data (multicast channel (MCH)).

In FIG. 1, the following downlink physical signals are used in the downlink radio communication. The downlink physical signals are not used to transmit the information output from the higher layer, but are used by the physical layer.

Synchronization signal (SS)
Downlink reference signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform the channel compensation on the downlink physical channel. The downlink reference signal is used in order for the terminal device 1 to calculate the downlink channel state information.

According to the present embodiment, the following five types of downlink reference signals are used.

Cell-specific reference signal (CRS)

UE-specific reference signal (URS) associated with the PDSCH

Demodulation reference signal (DMRS) associated with the EPDCCH

Non-zero power channel state information-reference signal (NZP CSI-RS)

Zero power channel state information-reference signal (ZP CSI-RS)

Multimedia broadcast and multicast service over single frequency network reference signal (MBSFN RS)

Positioning reference signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a medium access control (MAC) layer is referred to as a transport channel. The unit of the transport channel used in the MAC layer is also referred to as a transport block (TB) or a MAC protocol data unit (PDU). Control of a hybrid automatic repeat request (HARQ) is performed on each transport block in the MAC layer. The transport block is a unit of data that the MAC layer delivers to the physical layer. In the physical layer, the transport block is mapped to a codeword, and coding processing is performed on a codeword-by-codeword basis.

In the present embodiment, a group of the multiple serving cells is referred to as a PUCCH cell group. A certain serving cell belongs to any one of PUCCH cell groups.

A single PUCCH cell group includes one PUCCH serving cell. A single PUCCH cell group may include only one PUCCH serving cell. A single PUCCH cell group may include one PUCCH serving cell and one or multiple non-PUCCH serving cells.

The PUCCH cell group including the primary cell is referred to as a primary PUCCH cell group. The PUCCH cell group not including the primary cell is referred to as a secondary PUCCH cell group. In other words, the secondary PUCCH cell group includes a PUCCH secondary cell.

An index for identifying the PUCCH cell group (a cell group index) may be defined.

The index for the primary PUCCH cell group is always zero.

The index for the secondary PUCCH cell group is configured by a network device (the base station device 3).

The PUCCH of the PUCCH serving cell is used in order to transmit uplink control information (the HARQ-ACK and/or the CSI) with respect to the serving cell (the PUCCH serving cell, the non-PUCCH serving cell) included in the PUCCH cell group to which the PUCCH serving cell belongs.

In other words, the uplink control information (the HARQ-ACK and/or the CSI) with respect to the serving cell (the PUCCH serving cell, the non-PUCCH serving cell) included in the PUCCH cell group is transmitted on the PUCCH of the PUCCH serving cell included in the PUCCH cell group.

The present embodiment may be applied to only the HARQ-ACK. The present embodiment may be applied to only the CSI. The present embodiment may be applied to the HARQ-ACK and the CSI. The PUCCH cell group for the HARQ-ACK and the PUCCH cell group for the CSI may be defined independently. The PUCCH cell group for the HARQ-ACK and the PUCCH cell group for the CSI may be in common.

A configuration of the radio frame according to the present embodiment will be described below.

Figure 2:
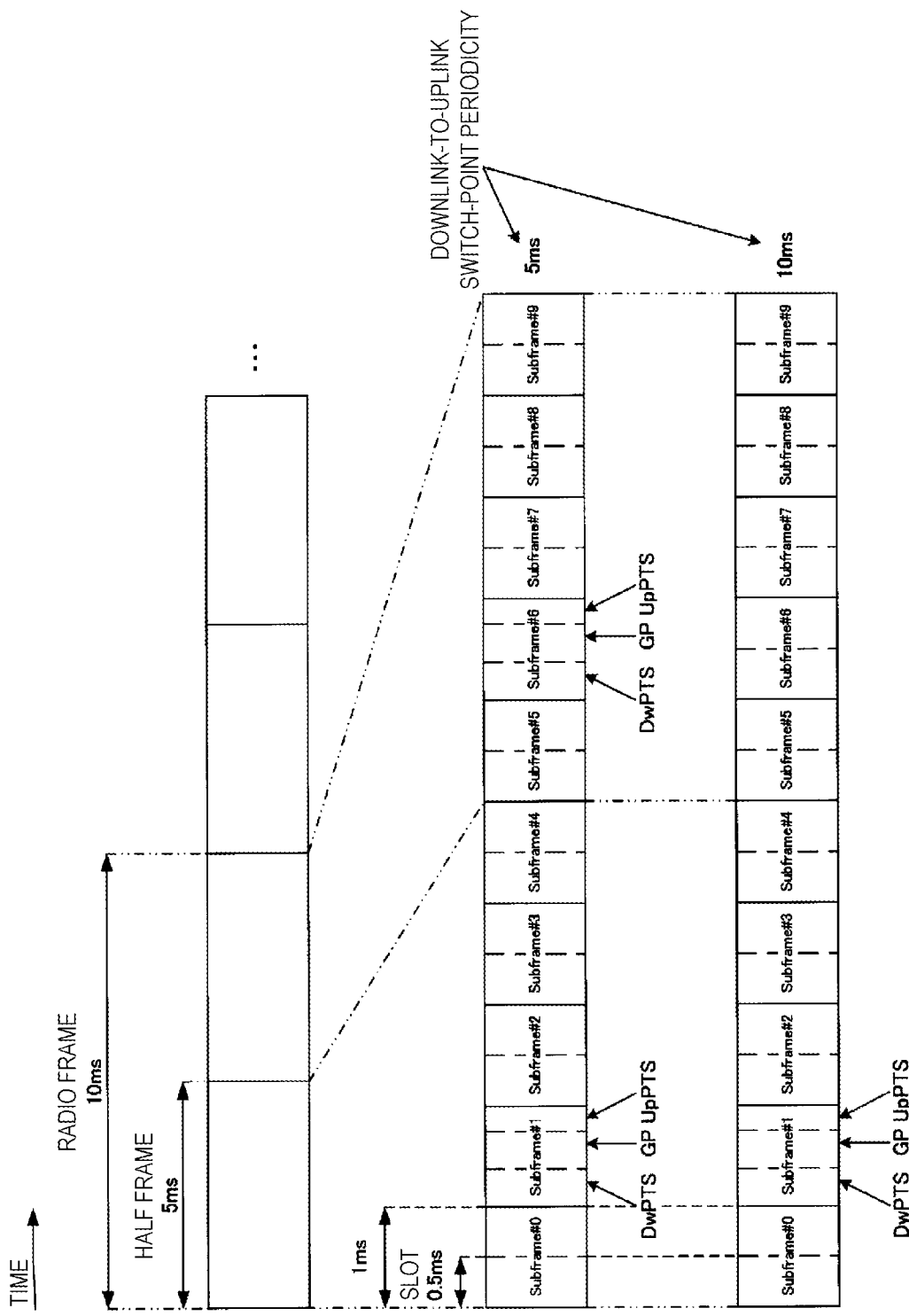
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ins in length. The i-th subframe within a radio frame is constituted of the (2×i)-th slot and the (2×i+1)-th slot. To be more precise, 10 subframes are available in each 10 ins interval.

A single radio frame is constituted of at least a downlink subframe, an uplink subframe, and a special subframe.

The downlink subframe is a subframe reserved for downlink transmission. The uplink subframe is a subframe reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted only of the DwPTS and the GP, or may be constituted only of the GP and the UpPTS.

A configuration of a slot according to the present embodiment will be described below.

Figure 3:
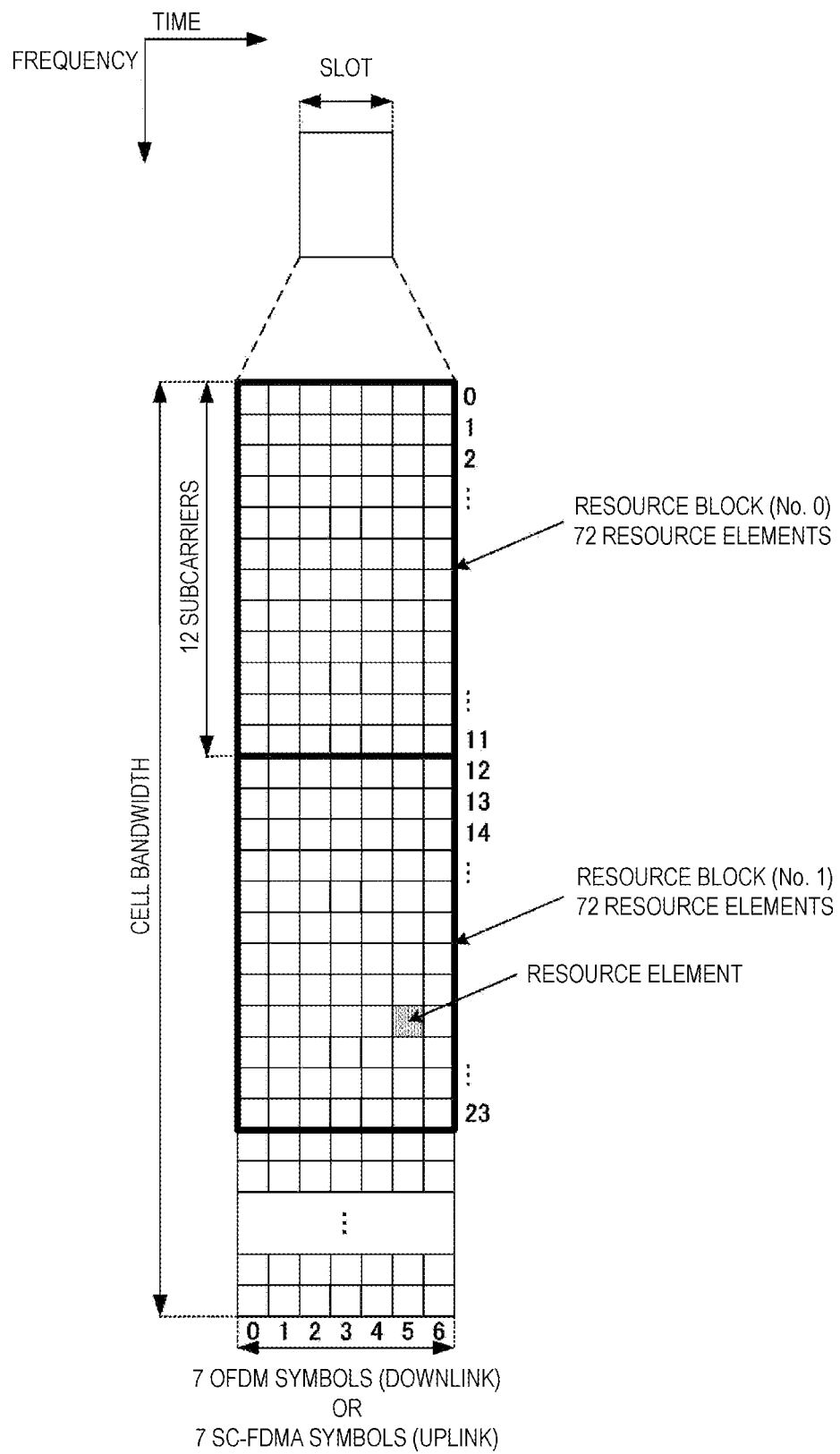
FIG. 3 is a diagram illustrating a configuration of a slot according to the present embodiment.

FIG. 3 is a diagram illustrating the configuration of the slot according to the present embodiment. According to the present embodiment, a normal cyclic prefix (CP) is applied to an OFDM symbol. Moreover, an extended cyclic prefix (CP) may be applied to the OFDM symbol. The physical signal or the physical channel transmitted in each of the slots is expressed by a resource grid. In FIG. 3, the horizontal axis is a time axis, and the vertical axis is a frequency axis. In downlink, the resource grid is defined by multiple subcarriers and multiple OFDM symbols. In uplink, the resource grid is defined by multiple subcarriers and multiple SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by a subcarrier number, and an OFDM symbol or SC-FDMA symbol number.

A resource block is used to express mapping of a certain physical channel (the PDSCH, the PDSCH, or the like) to resource elements. For the resource block, a virtual resource block and a physical resource block are defined. A certain physical channel is first allocated to the virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Therefore, one physical resource block is constituted of (7×12) resource elements. Furthermore, one physical resource block corresponds to one slot in the time domain and corresponds to 180 kHz in the frequency domain. Physical resource blocks are numbered from 0 in the frequency domain.

The physical channel and the physical signal that are transmitted in each of the subframes will be described below.

Figure 4:
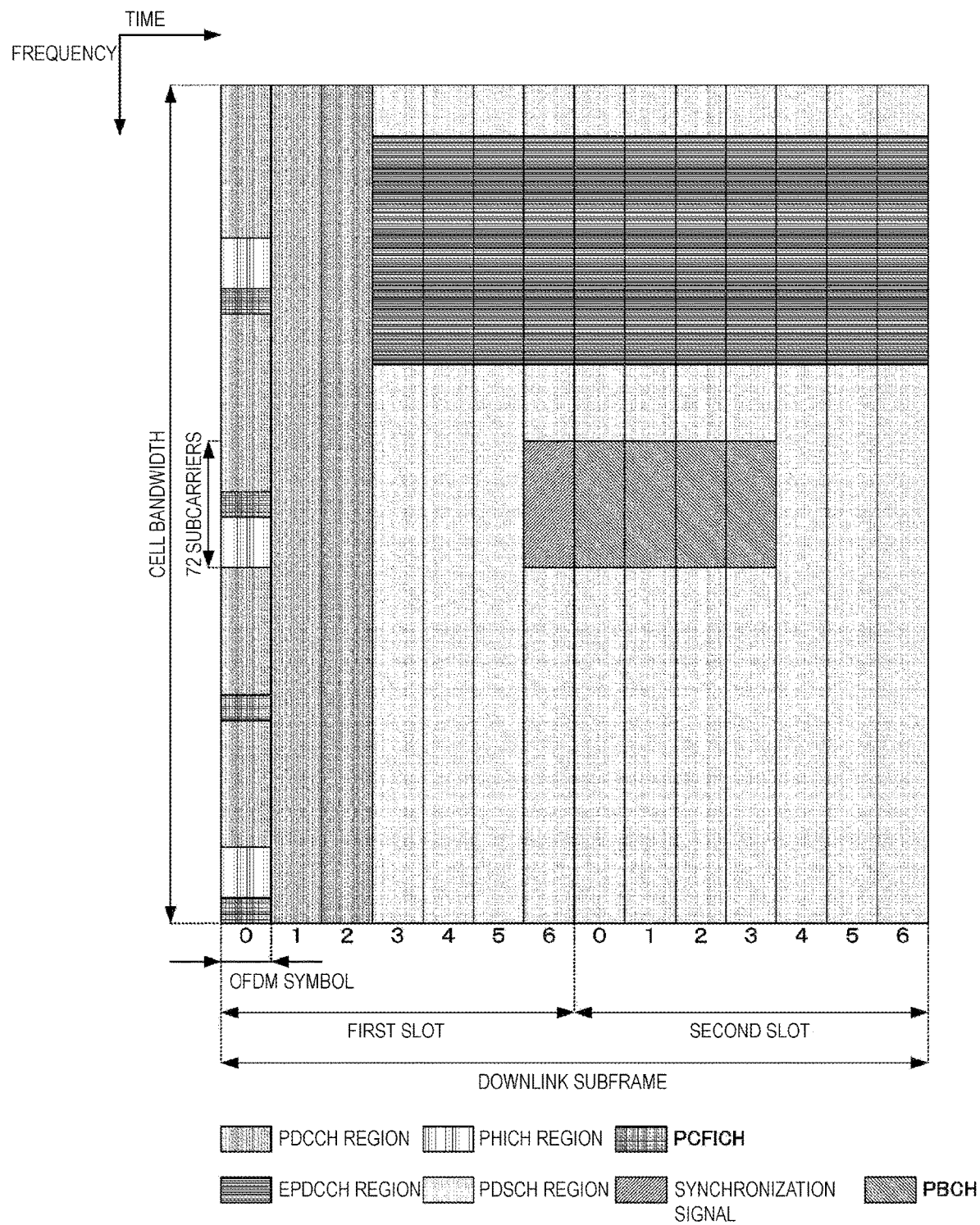
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal to the downlink subframe according to the present embodiment. In FIG. 4, the horizontal axis is a time axis, and the vertical axis is a frequency axis. In the downlink subframe, the base station device 3 may transmit the downlink physical channel (the PBCH, the PCFICH, the PHICH, the PDCCH, the EPDCCH, or the PDSCH), and the downlink physical signal (the synchronization signal or the downlink reference signal). Moreover, the PBCH is transmitted only in subframe 0 within the radio frame. Moreover, the downlink reference signal is mapped to the resource elements distributed in the frequency domain and the time domain. The downlink reference signal is not illustrated in FIG. 4 for the sake of simplicity.

Multiple PDCCHs may be frequency-multiplexed and time-multiplexed in a PDCCH region. Multiple EPDCCHs may be frequency-multiplexed, time-multiplexed, and spatial-multiplexed in an EPDCCH region. Multiple PDSCHs may be frequency-multiplexed and spatial-multiplexed in a PDSCH region. The PDCCH, and the PDSCH or the EPDCCH may be time-multiplexed. The PDSCH and the EPDCCH may be frequency-multiplexed.

Figure 5:
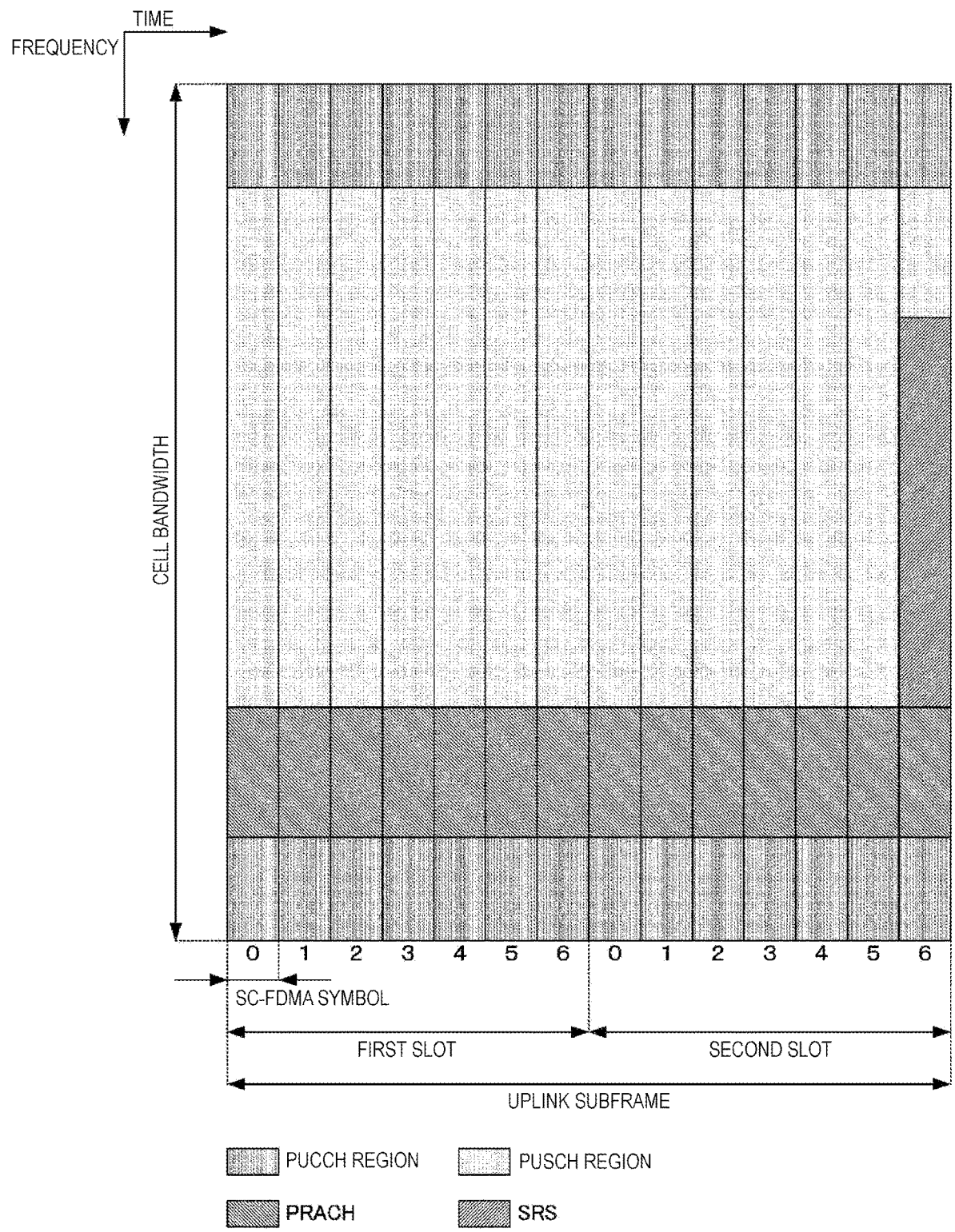
FIG. 5 is a diagram illustrating one example of allocation of a physical channel and mapping of a physical signal to an uplink subframe according to the present embodiment.

FIG. 5 is a diagram illustrating one example of the allocation of the physical channel and the mapping of the physical signal to the uplink subframe according to the present embodiment. In FIG. 5, the horizontal axis is a time axis, and the vertical axis is a frequency axis. In the uplink subframe, the terminal device 1 may transmit the uplink physical channel (the PUCCH, the PUSCH or the PRACH) and the uplink physical signal (the DMRS or the SRS). In a PUCCH region, multiple PUCCHs are frequency-multiplexed, time-multiplexed, and code-multiplexed. Multiple PUSCHs may be frequency-multiplexed and spatial-multiplexed in a PUSCH region. The PUCCH and the PUSCH may be frequency-multiplexed. The PRACH may be allocated to a single subframe or over two subframes. Furthermore, multiple PRACHs may be code-multiplexed.

The SRS is transmitted using the last SC-FDMA symbol within the uplink subframe. To be more precise, the SRS is mapped to the last SC-FDMA symbol within the uplink subframe. The terminal device 1 cannot transmit the SRS and the PUCCH/PUSCH/PRACH at the same time in a single SC-FDMA symbol in a single cell. In a single uplink subframe in a single cell, the terminal device 1 can transmit the PUSCH and/or the PUCCH using the SC-FDMA symbol except for the last SC-FDMA symbol within the uplink subframe, and can transmit the SRS using the last SC-FDMA symbol within the uplink subframe. To be more precise, in a single uplink subframe in a single cell, the terminal device 1 can transmit both of the SRS and the PUSCH/PUCCH. Moreover, the DMRS is time-multiplexed with the PUCCH or the PUSCH. The DMRS is not illustrated in FIG. 5 for the sake of simplicity.

Figure 6:
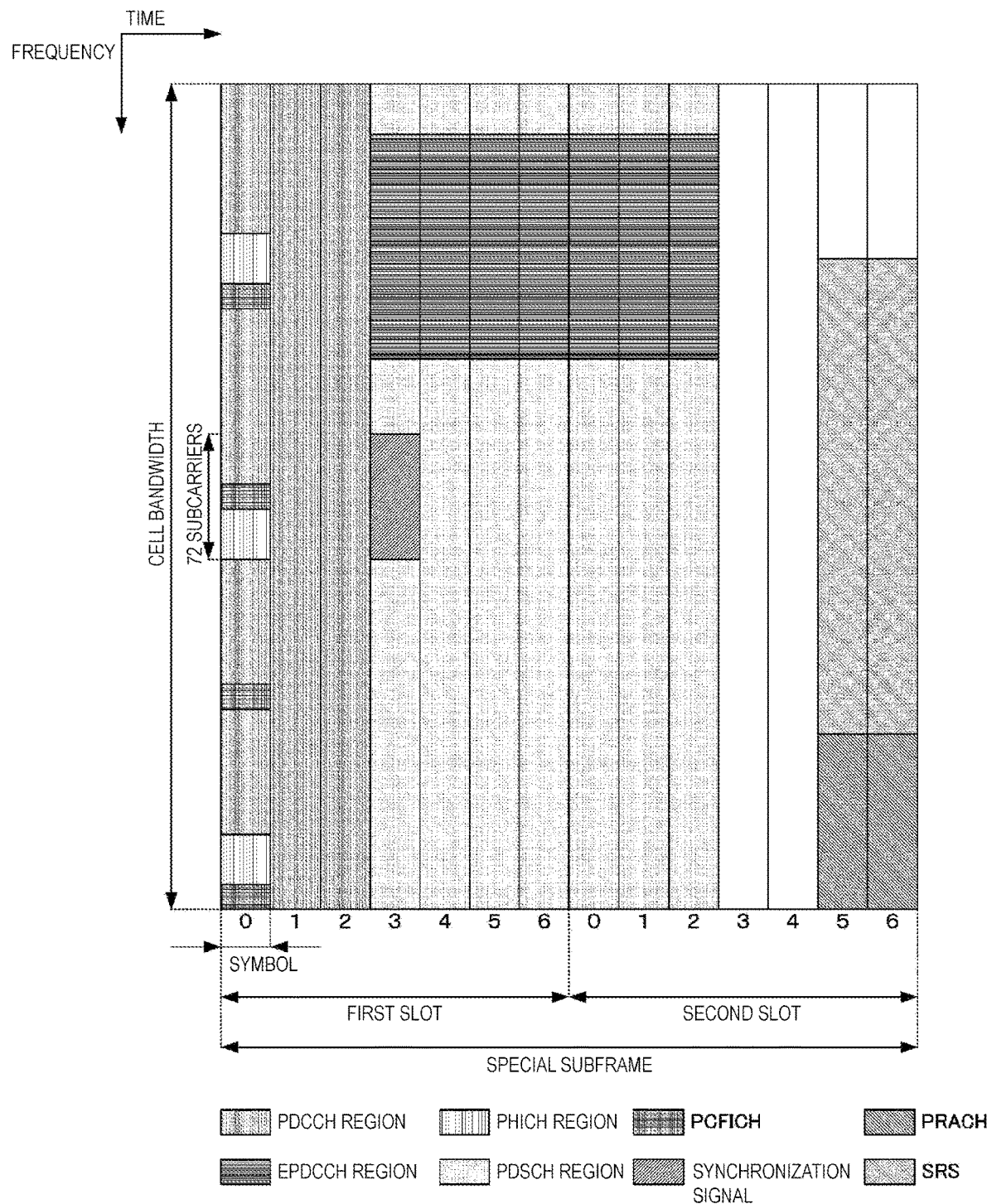
FIG. 6 is a diagram illustrating one example of allocation of a physical channel and mapping of a physical signal to a special subframe according to the present embodiment.

FIG. 6 is a diagram illustrating one example of allocation of the physical channel and mapping of the physical signal to the special subframe according to the present embodiment. In FIG. 6, the horizontal axis is a time axis, and the vertical axis is a frequency axis. In FIG. 6, the DwPTS is constituted of first to 10-th SC-FDMA symbols within the special subframe, the GP is constituted of 11-th and 12-th SC-FDMA symbols within the special subframe, and the UpPTS is constituted of 13-th and 14-th SC-FDMA symbols within the special subframe.

The base station device 3 may transmit the PCFICH, the PHICH, the PDCCH, the EPDCCH, the PDSCH, the synchronization signal, and the downlink reference signal, in the DwPTS of the special subframe. The base station device 3 does not transmit the PBCH in the DwPTS of the special subframe. The terminal device 1 may transmit the PRACH and the SRS in the UpPTS of the special subframe. To be more precise, the terminal device 1 transmits none of the PUCCH, the PUSCH, and the DMRS in the UpPTS of the special subframe.

Figure 7:
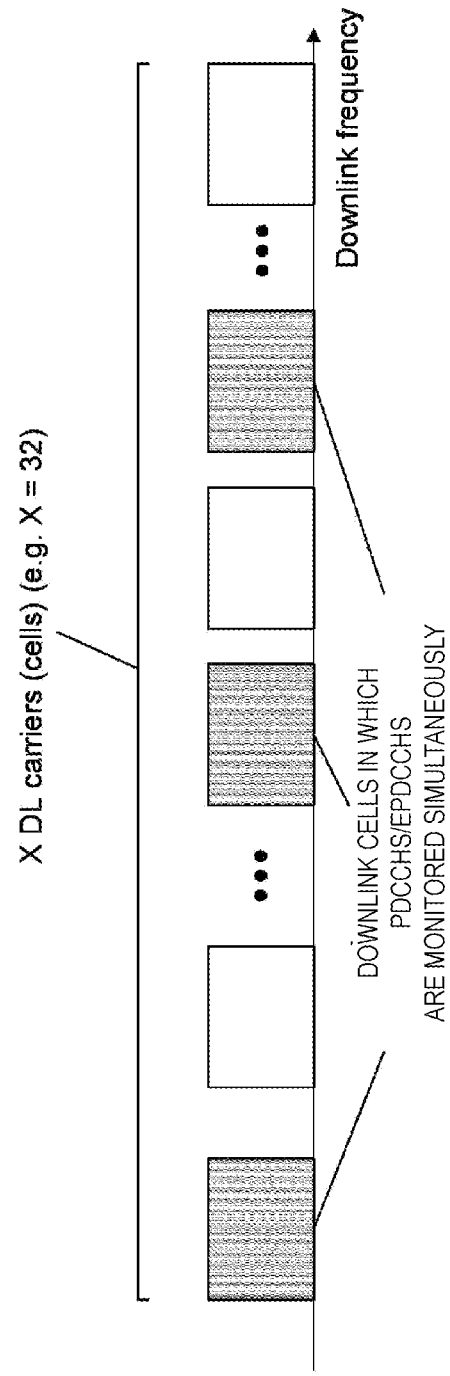
FIG. 7 is a diagram illustrating one example of downlink cells in which a physical downlink control channel/an enhanced physical downlink control channel is monitored under a condition where more than five downlink carriers are configured, according to the present embodiment.

FIG. 7 is a diagram illustrating a configuration where more than five downlink cells are configured for the terminal device 1 according to the present embodiment.

In the present embodiment, for example, the career aggregation of up to 32 downlink component carriers (downlink cells) may be supported as illustrated in FIG. 7. In other words, the base station device 3 and the terminal device 1 can perform simultaneous transmission and/or reception on multiple physical channels in up to 32 serving cells. Here, the number of the uplink component careers may be less than the number of the downlink component careers.

In FIG. 7, according to the present embodiment, the downlink component careers are configured for the terminal device 1 in an RRC layer with a parameter (for example, SCellToAddMod-r13) indicating a component career to be configured, and a list (for example, sCellToAddModList-r13) of component careers to be configured.

Furthermore, in the present embodiment, a parameter indicating the number of cells in which the terminal device 1 can monitor the PDCCHs/EPDCCHs simultaneously and the respective indexes of the cells (for example, SCellIndex-r13), or indexes of cells in which the PDCCHs/EPDCCHs can be monitored simultaneously (for example, SCellIndex-r13) may be configured from the configured list.

Furthermore, in the present embodiment, the number of cells in which the terminal device 1 can receive the PDSCHs simultaneously and the respective indexes of the cells (for example, SCellIndex-r13), or indexes of cells in which the PDSCHs can be received simultaneously (for example, SCellIndex-r13) may be configured from the configured list.

Figure 8:
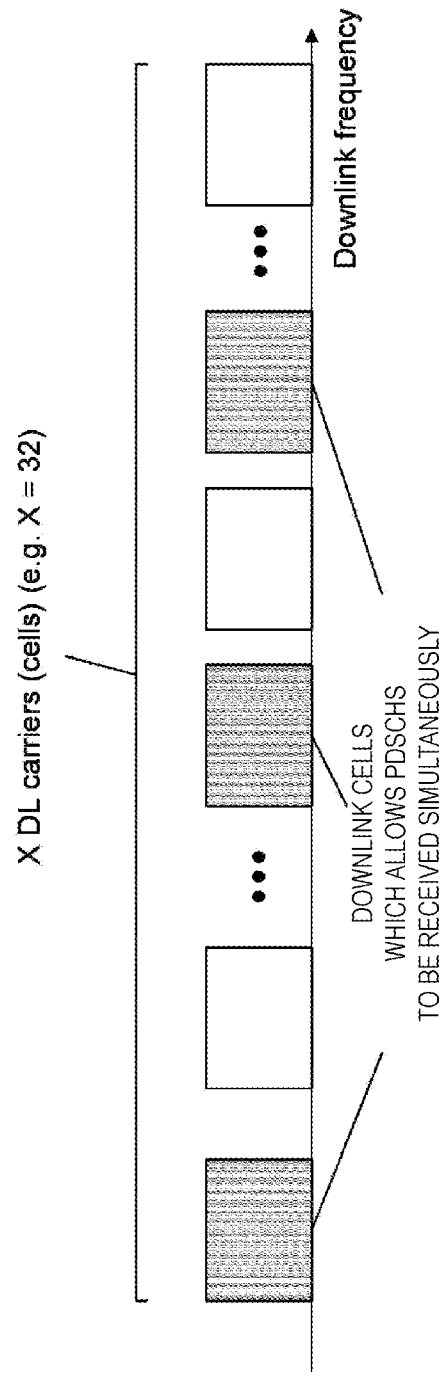
FIG. 8 is a diagram illustrating one example of the downlink cells in which physical downlink shared channels can be received simultaneously under a condition where more than five downlink carriers are configured, according to the present embodiment.

FIG. 8 illustrates an example of a configuration where the downlink cells that allow the terminal device to simultaneously receive PDSCHs are configured.

If the serving cell is the primary cell, or if the serving cell is the secondary cell and the terminal device 1 is not configured to monitor the PDCCH/EPDCCH with the CIF corresponding to the serving cell (the secondary cell) in a different serving cell (the primary cell), the terminal device 1 receives the PDSCH of the serving cell via the PDCCH/EPDCCH.

The monitoring of the PDCCH/EPDCCH with the CIF refers to attempting to decode the PDCCH or the EPDCCH in accordance with the DCI format including the CIF. The CIF is a field to which a carrier indicator is mapped. The value of the carrier indicator indicates the serving cell to which the DCI format associated with the carrier indicator corresponds.

The terminal device 1 that is configured to monitor the PDCCH/EPDCCH with the CIF corresponding to the serving cell in a different serving cell monitors the PDCCH/EPDCCH with the CIF in the different serving cell.

The terminal device 1 that is configured to monitor the PDCCH/EPDCCH with the CIF corresponding to the serving cell in the different serving cell preferably receives the PDSCH for the serving cell via the PDCCH/EPDCCH in the different serving cell.

The terminal device 1 that is not configured to monitor the PDCCH/EPDCCH with the CIF corresponding to the serving cell in the different serving cell monitors the PDCCH/EPDCCH with or without the CIF in the serving cell.

The terminal device 1 that is not configured to monitor the PDCCH/EPDCCH with the CIF corresponding to the serving cell in the different serving cell preferably receives third information for the serving cell via the PDCCH/EPDCCH in the serving cell.

The PDCCH/EPDCCH for the primary cell is transmitted in the primary cell. The third information for the primary cell is preferably transmitted on the PDCCH/EPDCCH in the primary cell.

The base station device 3 transmits, to the terminal device 1, a parameter (for example, cif-Presence) indicating whether or not the CIF is included in the DCI format transmitted in the primary cell.

For each secondary cell, the base station device 3 transmits, to the terminal device 1, a parameter (for example, CrossCarrierSchedulingConfig-r13) associated with cross carrier scheduling.

The parameter (for example, CrossCarrierSchedulingConfig-r13) includes a parameter (for example, schedulingCellInfo-r13) indicating whether the PDCCH/EPDCCH corresponding to an associated secondary cell is transmitted in the secondary cell or in a different serving cell.

When the parameter (for example, schedulingCellInfo-r13) indicates that the PDCCH/EPDCCH corresponding to the associated secondary cell is transmitted in the secondary cell, the parameter (for example, schedulingCellInfo-r13) includes a parameter (for example, cif-Presence) indicating whether or not the CIF is included in the DCI format transmitted in the secondary cell.

When the parameter (for example, schedulingCellInfo-r13) indicates that the PDCCH/EPDCCH corresponding to the associated secondary cell is transmitted in a different serving cell, the parameter (for example, schedulingCellInfo-r13) includes a parameter (for example, schedulingCellId) indicating in which serving cell the downlink allocation for the associated secondary cell is sent.

Figure 9:
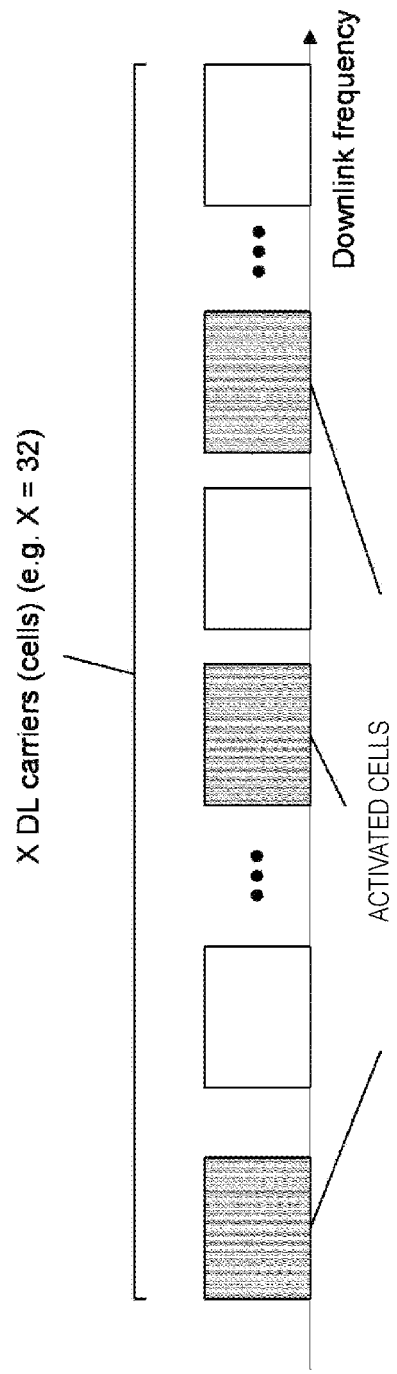
FIG. 9 is a diagram illustrating one example of activated downlink cells under a condition where more than five downlink carriers are configured, according to the present embodiment.

FIG. 9 illustrates, as another embodiment of the present invention, an example of a configuration where the downlink cells capable of being activated simultaneously are configured.

In FIG. 9, the downlink component careers are configured for the terminal device 1 in the RRC layer with the parameter (for example, SCellToAddMod-r13) indicating a component career to be configured, and the list (for example, sCellToAddModList-r13) of component careers to be configured.

Furthermore, the number of the downlink cells capable of being activated simultaneously may be configured for the terminal device 1 with a parameter for configuring the number of the downlink cells capable of being activated simultaneously.

Note that the terminal device 1 may include information to be used for indicating the number of the downlink cells capable of being activated simultaneously (the number of downlink component careers) into the capability of the terminal device (UE-EUTRA Capability, information on capability) and transfer/transmit the information to the base station device 3. In other words, the terminal device 1 may include the information to be used for indicating the number of downlink component careers capable of being activated simultaneously into the information on capability and transmit the information. Here, the primary cell and/or the PUCCH secondary cell may always be activated. For example, the terminal device 1 which supports activation of up to five downlink component careers including the primary cell may transmit information to be used for indicating "4" or "5", as the information to be used for indicating the number of downlink component careers capable of being activated simultaneously.

Note that the terminal device 1 may include information to be used for indicating the number of the uplink cells capable of being activated simultaneously (the number of uplink component careers) into the capability of the terminal device (UE-EUTRA Capability, information on capability) and transfer/transmit the information to the base station device 3. In other words, the terminal device 1 may include the information to be used for indicating the number of uplink component careers capable of being activated simultaneously into the information on capability and transmit the information.

In other words, the terminal device 1 may include the information to be used for indicating the number of PDCCHs that the terminal device 1 is capable of receiving (capable of monitoring, capable of detecting) simultaneously in a subframe into the information on capability and transmit the information. The terminal device 1 may include the information to be used for indicating the number of PDSCHs that the terminal device 1 is capable of receiving simultaneously in a subframe into the information on capability and transmit the information. For example, the terminal device 1 may transmit information indicating the possible combinations of physical channels that the terminal device 1 is capable of receiving simultaneously in the downlink in a certain subframe (the same subframe). Here, for example, the physical channels may include the PDCCH. The physical channels may include the EPDCCH. The physical channels may include the PDSCH. The physical channels may include the PBCH. The physical channels may include the PMCH.

The terminal device 1 may transmit the information to be used for indicating the number of PDCCHs and/or the number of PDSCHs that the terminal device 1 is capable of receiving simultaneously in a subframe, for each RNTI to be monitored. For example, the terminal device 1 may transmit the information to be used for indicating the number of PDCCHs and/or the number of PDSCHs that the terminal device 1 is capable of receiving simultaneously in a subframe, the PDCCHs having the CRC scrambled with the SI-RNTI added thereto and the PDSCHs being scheduled using the PDCCHs. Here, the number of PDCCHs having the CRC scrambled with the SI-RNTI added thereto may be one. The number of PDSCHs scheduled using the PDCCH may be one.

The terminal device 1 may transmit the information to be used for indicating the number of PDCCHs and/or the number of PDSCHs that the terminal device 1 is capable of receiving simultaneously in a subframe, the PDCCHs having the CRC scrambled with the RA-RNTI added thereto and the PDSCHs being scheduled using the PDCCHs. Here, the number of PDCCHs having the CRC scrambled with the RA-RNTI added thereto may be one. The number of PDSCHs scheduled using the PDCCH may be one.

The terminal device 1 may transmit the information to be used for indicating the number of PDCCHs and/or the number of PDSCHs that the terminal device 1 is capable of receiving simultaneously in a subframe, the PDCCHs having the CRC scrambled with the temporary C-RNTI added thereto and the PDSCHs being scheduled using the PDCCHs. Here, the number of PDCCHs having the CRC scrambled with the temporary C-RNTI added thereto may be one. The number of PDSCHs scheduled using the PDCCH may be one.

The terminal device 1 may transmit the information to be used for indicating the number of PDCCHs and/or the number of PDSCHs that the terminal device 1 is capable of receiving simultaneously in a subframe, the PDCCHs having the CRC scrambled with the C-RNTI and/or the SPS C-RNTI added thereto and the PDSCHs being scheduled using the PDCCHs. Here, the number of PDCCHs having the CRC scrambled with the SPS C-RNTI added thereto may be one. The number of PDSCHs scheduled using the PDCCH may be one. Here, the PDCCH having the CRC scrambled with the SPS C-RNTI added thereto is used for scheduling of the PDSCH.

In other words, the terminal device 1 may transmit the information to be used for indicating the number of combinations of PDCCHs and PDSCHs that the terminal device 1 is capable of receiving simultaneously in a subframe, the PDCCHs having the CRC scrambled with the C-RNTI and/or the SPS C-RNTI added thereto. Here, the PDSCHs are scheduled via the PDCCHs.

The base station device 3 may activate downlink cells in the MAC layer in accordance with the configured number of downlink cells capable of being activated simultaneously.

The terminal device 1 monitors the PDCCHs/EPDCCHs of the activated cells, and receives the PDSCHs via the PDCCHs/EPDCCHs. In other words, the terminal device 1 monitors the PDCCHs/EPDCCHs in the activated cells. The terminal device 1 does not monitor the PDCCH/EPDCCH in any deactivated cell.

Here, the base station device 3 may activate or deactivate one or multiple serving cells using a higher layer signal (for example, a MAC control element). For example, the mechanism of activation or deactivation may be based on the combination of the MAC control element and a timer (deactivation timer) associated with the deactivation.

Here, the base station device 3 may activate or deactivate individually the multiple secondary cells including the PUCCH secondary cell using a single command (a single activation/deactivation command). In other words, the base station device 3 may transmit the single command to be used for activating or deactivating the secondary cells using the MAC control element.

As a value of the timer associated with the deactivation, a single common value may be configured by the higher layer (for example, the RRC layer) for each terminal device 1. The timer (the value of the timer) associated with the deactivation may be held for each secondary cell.

The base station device 3 may transmit the higher layer signal including the timer associated with the deactivation for the secondary cell and information for configuration.

Note that the number of cells in which the PDCCHs/EPDCCHs can be monitored simultaneously, the number of cells in which the PDSCHs can be received simultaneously, or the number of cells that can be activated simultaneously may not be configured for each downlink component career, but may be configured for each cell group (for example, the PUCCH cell group).

Figure 10:
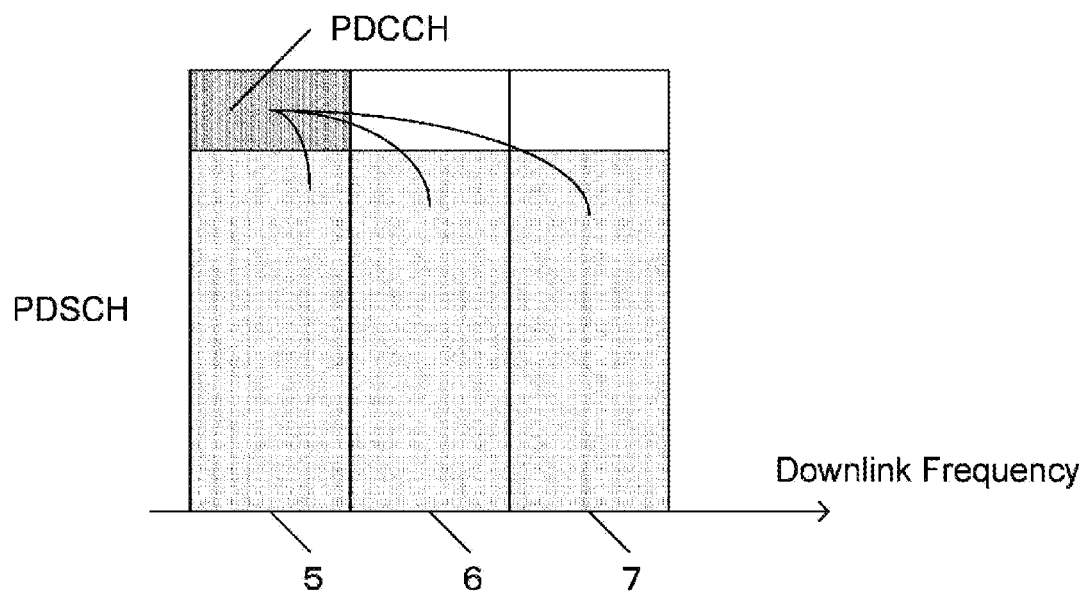
FIG. 10 is a diagram illustrating one example of a configuration where resources on downlink shared channels are indicated via a downlink control channel under a condition where joint coding has been applied to multiple downlink cells, according to the present embodiment.

Next, FIG. 10 illustrates, as another embodiment, an example of a configuration where joint coding that indicates PDSCHs of multiple cells through a PDCCH/EPDCCH is applied when the multiple downlink cells are configured.

In FIG. 10, for the base station device 3, downlink cells 5, 6 and 7 are at least configured and activated. The terminal device 1 monitors the PDCCH of the downlink cell 5, and receives the PDSCHs of the downlink cells 5, 6 and 7 in accordance with the result of decoding the downlink control information (DCI). Note that the monitoring of the PDCCH of the downlink cell 5 may be configured in the terminal device 1, for example, from second information in the RRC layer, or may be implicitly configured from information configured as another parameter.

Although FIG. 10 illustrates an example using the PDCCH, the EPDCCH is also applicable. The cell to be monitored by the terminal device 1 may be the primary cell, or a cell configured in the secondary cell. The cell may be the PUCCH cell in the cell group, and the terminal device 1 may monitor only a cell including the PDCCH/EPDCCH on which joint coding is performed. Here, whether or not the joint coding is performed may be configured for the terminal device 1 through an RRC parameter, for example, the third information.

Here, the terminal device 1 may monitor the PDCCH in the downlink cell 5, and may receive the PDSCH in the downlink cell 5, the PDSCH in the downlink cell 6, and the PDSCH in the downlink cell 7, in accordance with the downlink control information. Alternatively, the terminal device 1 may monitor the PDCCH in the downlink cell 5, and receive a single PDSCH over the downlink cell 5, the downlink cell 6, and the downlink cell 7, in accordance with the downlink control information.

In other words, the DCI format used for the scheduling of the multiple PDSCHs in the multiple downlink cells may be defined as a downlink control information format. Here, the single PDSCH may be scheduled for each of the multiple downlink cells by using the downlink control information format. The DCI format used for the scheduling of the single PDSCH over the multiple downlink cells may be defined as the downlink control information format. Here, the single PDSCH may be scheduled over the multiple downlink cells by using the downlink control information format. Here, the downlink control information format used for the scheduling of the multiple PDSCHs in the multiple downlink cells, and/or the downlink control information format used for the scheduling of the single PDSCH over the multiple downlink cells are also referred to as DCI format 6.

The PDCCH/EPDCCH used for transmission of DCI format 6 is also referred to as joint-coded PDCCH/EPDCCH (first PDCCH/EPDCCH). Alternatively, another name, such as DCI format 2E, may be used, but the following description will be made using the name, DCI format 6. Monitoring of the first PDDCH/EPDCCH by the terminal device 1 is also referred to as monitoring in accordance with the first PDDCH/EPDCCH. In other words, the monitoring in accordance with the first PDDCH/EPDCCH may include attempting to decode the first PDDCH/EPDCCH. "Monitoring" refers to attempting to decode each PDCCH in a set of PDCCH candidates and/or attempting to decode each EPDCCH in a set of EPDCCH candidates, in accordance with the monitored downlink control information format.

The multiple PDSCHs scheduled in accordance with a single DCI format 6 may be configured by the base station device 3. For example, the base station device 3 may configure the multiple PDSCHs scheduled in accordance with a single DCI format 6 by configuring a serving cell index corresponding to the multiple PDSCHs. For example, the base station device 3 may configure the multiple PDSCHs scheduled in accordance with a single DCI format 6, in accordance with information included in the higher layer signal.

For example, the base station device 3 may transmit, for each serving cell, information for configuring the monitoring in accordance with the first PDCCH/EPDCCH to be performed (configuring DCI format 6 to be received), and information indicating that the PDSCH is to be scheduled in a certain serving cell.

For example, the base station device 3 may configure the monitoring in accordance with the first PDCCH/EPDCCH to be performed for the downlink cell 5. The base station device 3 may transmit information indicating that the first PDCCH/EPDCCH (alternatively, DCI format 6 may be used) to be used for the scheduling of the PDSCH in the downlink cell 5 is transmitted in the downlink cell 5. The base station device 3 may transmit information indicating that the first PDCCH/EPDCCH to be used for the scheduling of the PDSCH in the downlink cell 6 is transmitted in the downlink cell 5. The base station device 3 may transmit information indicating that the first PDCCH/EPDCCH to be used for the scheduling of the PDSCH in the downlink cell 7 is transmitted in the downlink cell 5.

Although FIG. 10 illustrates an example using the PDCCH, the EPDCCH is also applicable. The cell to be monitored by the terminal device 1 may be the primary cell, or a cell configured in the secondary cell. The cell may be the PUCCH cell in the cell group, and the terminal device 1 may monitor only a cell including a joint-coded PDCCH/EPDCCH. Here, whether or not the joint coding is performed may be configured for the terminal device 1 through the RRC parameter.

Figure 11:
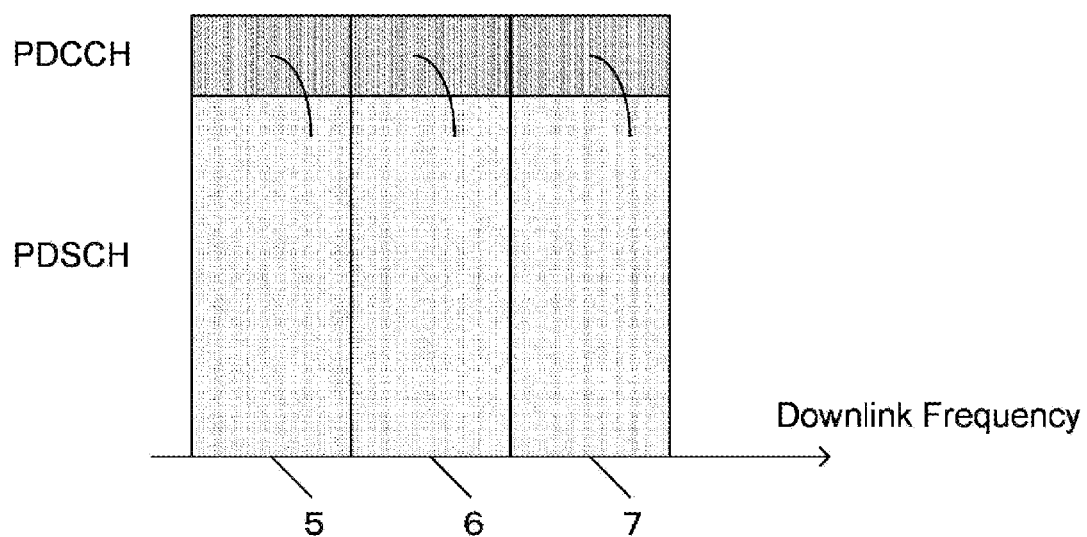
FIG. 11 is a diagram illustrating one example of a configuration where resources on downlink shared channels are indicated via downlink control channels under a condition where separate coding has been applied to multiple downlink cells, according to the present embodiment.

FIG. 11 illustrates an example of a configuration where the PDSCHs are received via the PDCCHs/EPDCCHs that are configured for each cell rather than being joint-coded. In other words, as described above, the DCI format used for the scheduling of a single PDSCH in a single downlink cell may be defined as the DCI format (for example, the DCI format may be defined as DCI format 1 or DCI format 1A). Each PDCCH/EPDCCH used for transmission of the DCI format that is used for the scheduling of the single PDSCH in the single downlink cell is also referred to as a separate-coded PDCCH/EPDCCH (second PDCCH/EPDCCH). Monitoring of the second PDDCH/EPDCCH by the terminal device 1 is also referred to as monitoring in accordance with the second PDDCH/EPDCCH. In other words, the monitoring in accordance with the second PDDCH/EPDCCH may include attempting to decode the second PDDCH/EPDCCH.

When the base station device 3 has made a configuration where the terminal device 1 assumes the joint-coded PDCCH/EPDCCH, the base station device 3 may transmit only the joint-coded PDCCH/EPDCCH, rather than separate-coded PDCCHs/EPDCCHs as illustrated in FIG. 11. When the joint coding is configured, the terminal device 1 may, without expecting the separate coding, monitor the PDCCH/EPDCCH of the configured downlink cell.

Specifically, the base station device 3 may make a configuration of, for each serving cell, whether monitoring is performed in accordance with the first PDCCH/EPDCCH or the second PDCCH/EPDCCH. The base station device 3 may transmit the higher layer signal including information to be used for indicating whether monitoring is performed in accordance with the first PDCCH/EPDCCH or the second PDCCH/EPDCCH. Here, for a single serving cell, monitoring in accordance with both the first PDCCH/EPDCCH and the second PDCCH/EPDCCH is not configured. In other words, the monitoring in accordance with the first PDCCH/EPDCCH and the monitoring in accordance with the second PDCCH/EPDCCH may not exist together in a single serving cell. In other words, the terminal device 1 may always perform, in a single serving cell, either the monitoring in accordance with the first PDCCH/EPDCCH or the monitoring in accordance with the second PDCCH/EPDCCH.

DCI format 6 may be used at least for scheduling of the PDSCH in the same serving cell, i.e., a cell in which DCI format 6 is transmitted. In other words, the PDSCH in the serving cell in which DCI format 6 is transmitted is not scheduled in accordance with a DCI format transmitted in a different serving cell from the serving cell. In other words, the serving cell configured to perform the monitoring in accordance with the first PDCCH/EPDCCH is not scheduled in accordance with the DCI format (alternatively, the PDCCH may be used) transmitted in the different serving cell from the serving cell. In other words, the serving cell configured to perform the monitoring in accordance with the first PDCCH/EPDCCH is always scheduled in accordance with the DCI format (alternatively, the PDCCH may be used) transmitted in the serving cell.

Here, DCI format 6 (alternatively, the first PDCCH/EPDCCH may be used) may be received (detected) only in a UE-specific search space (USS). In other words, DCI format 6 may not be mapped to a common search space (CSS), but may be mapped only to the USS. In other words, the terminal device 1 may attempt to decode DCI format 5 (alternatively, the first PDCCH/EPDCCH may be used) only in the UE-specific search space.

Here, for example, the USS (a position of USS, an index) to which DCI format 6 is mapped may be calculated (may be given) on the basis of a hash function using at least the C-RNTI and the serving cell index.

As described above, the base station device 3 may configure the multiple PDSCHs scheduled in accordance with a single DCI format 6, by using information included in the higher layer signal. For example, the base station device 3 may transmit information indicating that the first PDCCH/EPDCCH (alternatively, DCI format 6 may be used) to be used for the scheduling of the PDSCH in the downlink cell 5 (for example, serving cell index 1) is transmitted in the downlink cell 5. The base station device 3 may transmit information indicating that the first PDCCH/EPDCCH to be used for the scheduling of the PDSCH in the downlink cell 6 (for example, serving cell index 2) is transmitted in the downlink cell 5. The base station device 3 may transmit information indicating that the first PDCCH/EPDCCH to be used for the scheduling of the PDSCH in the downlink cell 7 (for example, serving cell index 3) is transmitted in the downlink cell 5.

The serving cell index used for calculating the USS to which DCI format 6 is mapped may be the smallest serving cell index (in this example, serving cell index 1) among the serving cell indexes configured by the base station device 3. The serving cell index used for calculating the USS to which the DCI format is mapped may be the largest serving cell index (in this example, serving cell index 3) among the serving cell indexes configured by the base station device 3. In other words, the serving cell index used for calculating the USS to which DCI format 6 is mapped may be determined on the basis of the information transmitted by the base station device 3 using the higher layer signal. In other words, the DCI format (the second PDCCH/EPDCCH) used for the scheduling of the multiple PDSCHs in the multiple serving cells may be determined on the basis of the information transmitted using the higher layer signal. Here, the serving cell index may be the same as the value of the CIF included in DCI format 6.

Here, the serving cell index used for calculating the USS to which DCI format 6 is mapped may be defined in advance in a specification or the like. For example, the serving cell index used for calculating the USS to which DCI format 6 is mapped may be zero. In other words, the serving cell index may not be used in the calculation of the USS to which DCI format 6 is mapped.

Here, the value of the CIF used for calculating the USS to which DCI format 1/1A (the second PDCCH/EPDCCH) is mapped may be determined on the basis of the serving cell index. For example, when crossing career scheduling is configured, the value of the CIF included in the DCI format is used for calculating the USS to which DCI format 1/1A (the second PDCCH/EPDCCH) is mapped.

When the crossing career scheduling is not configured, the CIF is not used for calculating the USS to which DCI format 1/1A (the second PDCCH/EPDCCH) is mapped.

Figure 12:
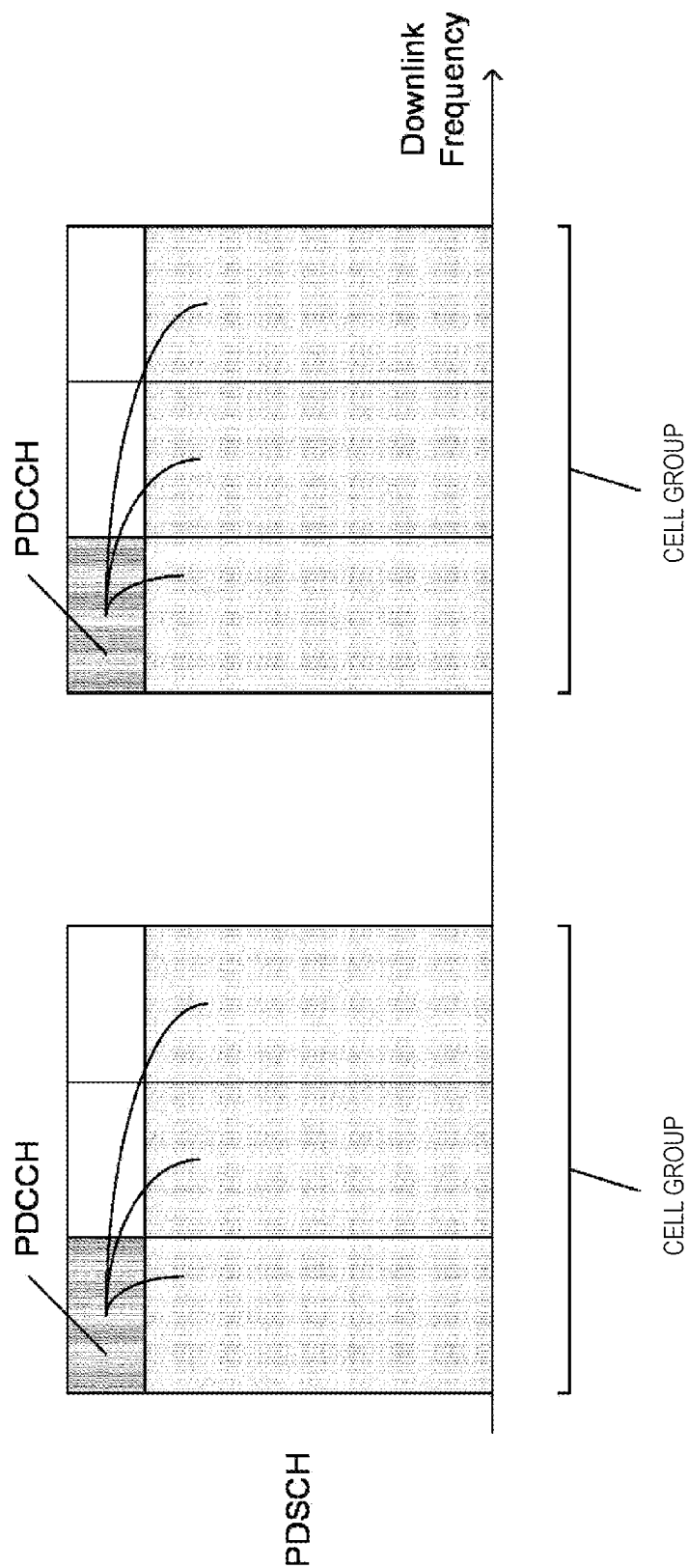
FIG. 12 is a diagram illustrating one example of a configuration where resources on downlink shared channels are indicated via a downlink control channel under a condition where joint coding has been applied to multiple downlink cells for each cell group, according to the present embodiment.

FIG. 12 is a drawing illustrating a configuration where the PDSCH is received via the PDCCH/EPDCCH when the cell group is configured.

In FIG. 12, the base station device 3 configures the downlink cell for each cell group in which the terminal device 1 monitors the PDCCH/EPDCCH. In this case, a single downlink cell is used as a monitoring cell in each cell group, and cell groups may be configured in the unit of PUCCH transmission (PUCCH cell group), and may be configured independently.

Configurations of devices according to the present embodiment will be described below.

Figure 13:
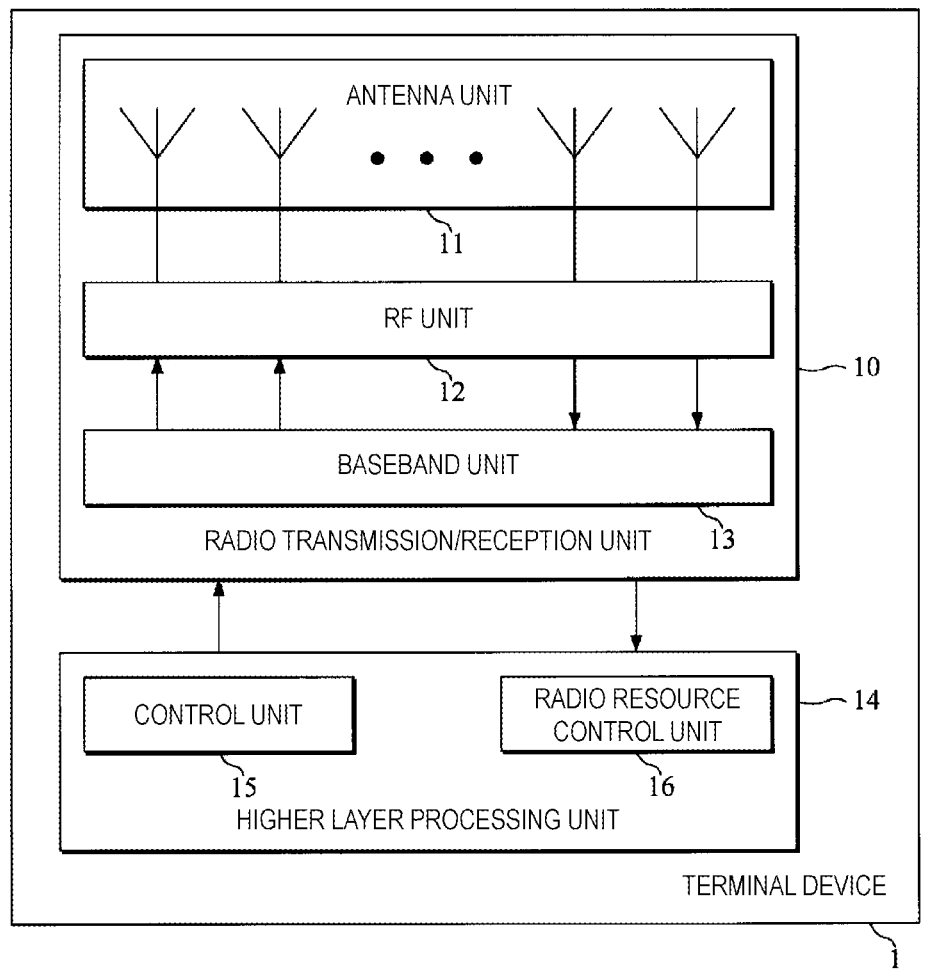
FIG. 13 is a schematic block diagram illustrating a configuration of a terminal device 1 according to the present embodiment.

FIG. 13 is a schematic block diagram illustrating a configuration of the terminal device 1 according to the present embodiment. As illustrated in FIG. 13, the terminal device 1 is configured to include a radio transmission/reception unit 10 and a higher layer processing unit 14. The radio transmission/reception unit 10 is configured to include an antenna unit 11, a radio frequency (RF) unit 12, and a baseband unit 13. The higher layer processing unit 14 is configured to include a control unit 15 and a radio resource control unit 16. The radio transmission/reception unit 10 is also referred to as a transmission unit or a reception unit.

The higher layer processing unit 14 outputs uplink data (transport block) generated by a user operation or the like, to the radio transmission/reception unit 10. The higher layer processing unit 14 performs processing of the medium access control (MAC) layer, the packet data convergence protocol (PDCP) layer, the radio link control (RLC) layer, and the radio resource control (RRC) layer.

The radio resource control unit 16 included in the higher layer processing unit 14 manages various configuration information/parameters of the terminal device 1 itself. The radio resource control unit 16 sets the various configuration information/parameters in accordance with a higher layer signal received from the base station device 3. Specifically, the radio resource control unit 16 sets the various configuration information/parameters in accordance with the information indicating the various configuration information/parameters received from the base station device 3.

The radio transmission/reception unit 10 performs processing of the physical layer, such as modulation, demodulation, coding, and decoding. The radio transmission/reception unit 10 demultiplexes, demodulates, and decodes a signal received from the base station device 3, and outputs the information resulting from the decoding to the higher layer processing unit 14. The radio transmission/reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a cyclic prefix (CP) from the digital signal resulting from the conversion, performs fast Fourier transform (FFT) on the signal from which the CP has been removed, and extracts a signal in the frequency domain.

The baseband unit 13 performs inverse fast Fourier transform (IFFT) on data to generate an SC-FDMA symbol, attaches a CP to the generated SC-FDMA symbol, generates a digital signal in a baseband, and converts the digital signal in the baseband into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11.

Figure 14:
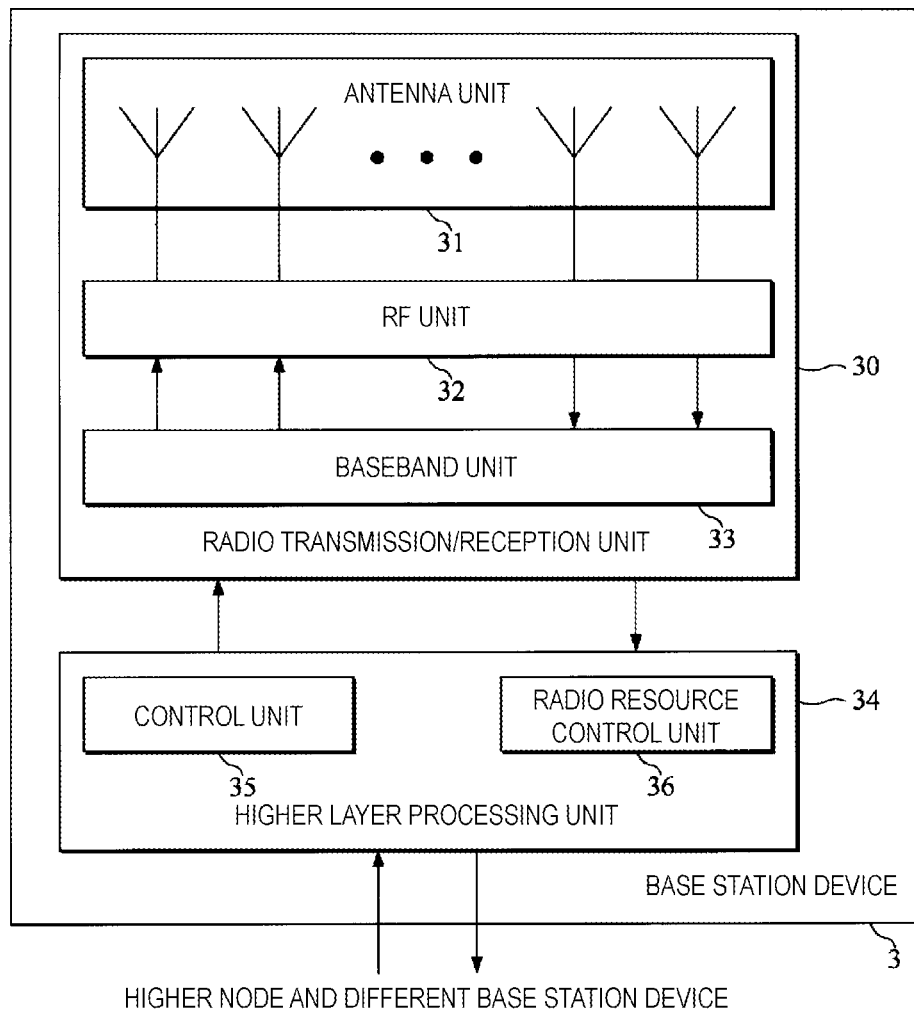
FIG. 14 is a schematic block diagram illustrating a configuration of a base station device 3 according to the present embodiment.

FIG. 14 is a schematic block diagram illustrating a configuration of the base station device 3 according to the present embodiment. As illustrated in FIG. 14, the base station device 3 is configured to include a radio transmission/reception unit 30 and a higher layer processing unit 34. The radio transmission/reception unit 30 is configured to include an antenna unit 31, an RF unit 32, and a baseband unit 33. The higher layer processing unit 34 is configured to include a control unit 35 and a radio resource control unit 36. The radio transmission/reception unit 30 is also referred to as a transmission unit or a reception unit.

The higher layer processing unit 34 performs processing of the medium access control (MAC) layer, the packet data convergence protocol (PDCP) layer, the radio link control (RLC) layer, and the radio resource control (RRC) layer.

The radio resource control unit 36 included in the higher layer processing unit 34 generates, or acquires from a higher node, downlink data (transport block) arranged on a physical downlink channel, system information, an RRC message, a MAC control element (CE), and the like, and outputs the generated or acquired data to the radio transmission/reception unit 30. Furthermore, the radio resource control unit 36 manages various configuration information/parameters for each of the terminal devices 1. The radio resource control unit 36 may set various configuration information/parameters for each of the terminal devices 1 via a higher layer signal. In other words, the radio resource control unit 36 transmits/broadcasts information indicating various configuration information/parameters.

The capability of the radio transmission/reception unit 30 is similar to that of the radio transmission/reception unit 10, and hence description thereof is omitted.

However, the capability of the radio transmission/reception unit 10 varies among the terminal devices 1. For example, combinations of bands (carriers, frequencies) to which carrier aggregation is applicable vary among the terminal devices 1. Therefore, the terminal device 1 transmits, to the base station device 3, information/parameter (UECapabilityInformation) indicating capability supported by the terminal device 1 itself.

The term "support" means that the terminal device 1 including hardware and/or software required to implement the capability (or the communication method) has passed the conformance test (standard certification test) specified in 3GPP.

As described above, a terminal device according to the present invention includes: a reception unit configured to receive information indicating that more than five downlink carriers are configured and information indicating the number of cells in which the terminal device is capable of simultaneously monitoring physical downlink control channels; and a monitoring unit configured to monitor physical downlink control channels of cells specified by the information indicating the number of cells in which the terminal device is capable of simultaneously monitoring physical downlink control channels.

A terminal device according to the present invention includes: a reception unit configured to receive information indicating that more than five downlink carriers are configured and information indicating the number of downlink cells capable of being activated simultaneously; a medium access control (MAC) layer processing unit configured to activate downlink cells in accordance with the information indicating the number of downlink cells capable of being activated simultaneously; and a monitoring unit configured to monitor physical downlink control channels of cells activated by the medium access control (MAC) layer processing unit.

A base station device according to the present invention includes: a transmission unit configured to transmit information indicating that more than five downlink carriers are configured and information indicating the number of cells in which a terminal device is capable of simultaneously monitoring physical downlink control channels; and a physical downlink control channel transmission unit configured to transmit physical downlink control channels of cells specified by the information indicating the number of cells in which the terminal device is capable of simultaneously monitoring physical downlink control channels.

A base station device according to the present invention includes: a transmission unit configured to transmit information indicating that more than five downlink carriers are configured and information indicating the number of downlink cells capable of being activated simultaneously; a medium access control (MAC) layer processing unit configured to activate downlink cells in accordance with the information indicating the number of downlink cells capable of being activated simultaneously; and a physical downlink control channel transmission unit configured to transmit physical downlink control channels of cells activated by the medium access control (MAC) layer processing unit.

A communication method according to the present invention is a communication method for the terminal device 1. The communication method includes the steps of: receiving information indicating that more than five downlink carriers are configured and information indicating the number of cells in which a terminal device is capable of simultaneously monitoring physical downlink control channels; and monitoring physical downlink control channels of cells specified by the information indicating the number of cells in which the terminal device is capable of simultaneously monitoring physical downlink control channels.

A communication method according to the present invention is a communication method for the terminal device 1. The communication method includes the steps of: receiving information indicating that more than five downlink carriers are configured and information indicating the number of downlink cells in which a terminal device is capable of being activated simultaneously; activating downlink cells in accordance with the information indicating the number of downlink cells capable of being activated simultaneously; and monitoring physical downlink control channels of the activated cells.

A communication method according to the present invention is a communication method for the base station device 3 configured to communicate with the terminal device 1. The communication method includes the steps of: transmitting information indicating that more than five downlink carriers are configured and information indicating the number of cells in which the terminal device is capable of simultaneously monitoring physical downlink control channels; and transmitting physical downlink control channels of cells specified by the information indicating the number of cells in which the terminal device is capable of simultaneously monitoring physical downlink control channels.

A communication method according to the present invention is a communication method for the base station device 3 configured to communicate with the terminal device 1. The communication method includes the steps of: transmitting information indicating that more than five downlink carriers are configured and information indicating the number of downlink cells capable of being activated simultaneously; activating downlink cells in accordance with the information indicating the number of downlink cells capable of being activated simultaneously; and transmitting physical downlink control channels of the activated cells.

An integrated circuit according to the present invention is an integrated circuit mounted on the terminal device 1 configured to communicate with the base station device 3. The integrated circuit causes the terminal device to exert the functions of: receiving information indicating that more than five downlink carriers are configured and information indicating the number of cells in which the terminal device is capable of simultaneously monitoring physical downlink control channels; and monitoring physical downlink control channels of cells specified by the information indicating the number of cells in which the terminal device is capable of simultaneously monitoring physical downlink control channels.

An integrated circuit according to the present invention is an integrated circuit mounted on the terminal device 1 configured to communicate with the base station device 3. The integrated circuit causes the terminal device to exert the functions of: receiving information indicating that more than five downlink carriers are configured and information indicating the number of downlink cells capable of being activated simultaneously; activating downlink cells in accordance with the information indicating the number of downlink cells capable of being activated simultaneously, and monitoring physical downlink control channels of the activated cells.

An integrated circuit according to the present invention is an integrated circuit mounted on the base station device 3 configured to communicate with the terminal device 1. The integrated circuit causes the base station device 3 to exert the functions of: transmitting information indicating that more than five downlink carriers are configured and information indicating the number of cells in which the terminal device is capable of simultaneously monitoring physical downlink control channels; and transmitting physical downlink control channels of cells specified by the information indicating the number of cells in which the terminal device is capable of simultaneously monitoring physical downlink control channels.

An integrated circuit according to the present invention is an integrated circuit mounted on the base station device 3 configured to communicate with the terminal device 1. The integrated circuit causes the base station device 3 to exert the functions of: transmitting information indicating that more than five downlink carriers are configured and information indicating the number of downlink cells capable of being activated simultaneously; activating downlink cells in accordance with the information indicating the number of downlink cells capable of being activated simultaneously, and transmitting physical downlink control channels of the activated cells.

A program running on each of the base station device 3 and the terminal device 1 according to the present invention may be a program that controls a central processing unit (CPU) and the like (a program for causing a computer to operate) in such a manner as to realize the functions according to the above-described embodiments of the present invention. The information handled in these devices is temporarily stored in a random access memory (RAM) while being processed. Thereafter, the information is stored in various types of read only memory (ROM) such as a flash ROM and a hard disk drive (HDD) and when necessary, is read by the CPU to be modified or rewritten.

Moreover, the terminal device 1 and the base station device 3 according to the above-described embodiments may be partially realized by the computer. This configuration may be realized by recording a program for realizing such control functions on a computer-readable medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to realize the functions described above in combination with a program already recorded in the computer system.

Furthermore, the base station device 3 according to the above-described embodiments can be realized as an aggregation (a device group) constituted of multiple devices. Devices constituting the device group may be each equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can communicate with the base station device as the aggregation.

Furthermore, the base station device 3 according to the above-described embodiments may be an Evolved Universal Terrestrial Radio Access Network (EUTRAN). Furthermore, the base station device 3 according to the above-described embodiments may have some or all portions of the function of a node higher than an eNodeB.

Furthermore, some or all portions of each of the terminal device 1 and the base station device 3 according to the above-described embodiments may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiments, the terminal device is described as one example of a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS 1 (1A, 1B, 1C) Terminal device
3 Base station device
5 Downlink cell
6 Downlink cell
7 Downlink cell
10 Radio transmission/reception unit
11 Antenna unit
12 RF unit
13 Baseband unit
14 Higher layer processing unit
15 Control unit
16 Radio resource control unit
30 Radio transmission/reception unit
31 Antenna unit
32 RF unit
33 Baseband unit
34 Higher layer processing unit
35 Control unit
36 Radio resource control unit

The invention claimed is:
1. A terminal device configured to communicate with a base station device, the terminal device comprising:
reception circuitry configured to receive a first Radio Resource Control (RRC) message including first information indicating that more than five cells are configured,
a plurality of Downlink Control Information (DCI) with a DCI format 1A being used for scheduling of one Physical Downlink Shared Channel (PDSCH) in one cell, the DCI being corresponding to each of the cells; and
monitoring circuitry configured to monitor physical downlink control channel candidates based on the DCI for the downlink cell, wherein
in a case that the reception circuitry receives a second RRC message including second information indicating reduction of the number of physical downlink control channel candidates that the terminal device is able to simultaneously monitor for the downlink cell, the number of physical downlink control channel candidates for a UE specific search space (USS) is reduced based on the second information.

2. A base station device configured to communicate with a terminal device, the base station device comprising:
first transmission circuitry configured to transmit
a first Radio Resource Control (RRC) message including first information indicating that more than five cells are configured, and
a plurality of Downlink Control Information (DCI) with a DCI format 1A being used for scheduling of one Physical Downlink Shared Channel (PDSCH) in one cell, the DCI being corresponding to each of the cells; and
second transmission circuitry configured to transmit physical downlink control channel candidates based on the DCI for the downlink cell, wherein
in a case that the first transmission circuitry transmits a second RRC message including second information indicating reduction of the number of physical downlink control channel candidates that the terminal device is able to simultaneously monitor for the downlink cell, the number of physical downlink control channel candidates for a UE specific search space (USS) is reduced based on the second information.

3. A communication method for a terminal device configured to communicate with a base station device, the communication method comprising:
receiving
a first Radio Resource Control (RRC) message including first information indicating that more than five cells are configured, and
a plurality of Downlink Control Information (DCI) with a DCI format 1A being used for scheduling of one Physical Downlink Shared Channel (PDSCH) in one cell, the DCI being corresponding to each of the cells; and
monitoring physical downlink control channel candidates based on the DCI for the downlink cell, wherein
in a case that the reception circuitry receives a second RRC message including second information indicating reduction of the number of physical downlink control channel candidates that the terminal device is able to simultaneously monitor for the downlink cell, the number of physical downlink control channel candidates for a UE specific search space (USS) is reduced based on the second information.

4. A communication method for a base station device configured to communicate with a terminal device, the communication method comprising:
transmitting
a first Radio Resource Control (RRC) message including first information indicating that more than five cells are configured, and
a plurality of Downlink Control Information) (DCI) with a DCI format 1A being used for scheduling of one Physical Downlink Shared Channel (PDSCH) in one cell, the DCI being corresponding to each of the cells; and
transmitting physical downlink control channel candidates based on the DCI for the downlink cell, wherein
in a case of transmitting a second RRC message including second information indicating reduction of the number of physical downlink control channel candidates that the terminal device is able to simultaneously monitor for the downlink cell, the number of physical downlink control channel candidates for a UE specific search space (USS) is reduced based on the second information.

5. An integrated circuit mountable on a terminal device configured to communicate with a base station device, the integrated circuit causing the terminal device to perform at least:
receiving
a first Radio Resource Control (RRC) message including first information indicating that more than five cells are configured, and
a plurality of Downlink Control Information (DCI) with a DCI format 1A being used for scheduling of one Physical Downlink Shared Channel (PDSCH) in one cell, the DCI being corresponding to each of the cells; and
monitoring physical downlink control channel candidates based on the DCI for the downlink cell, wherein
in a case of receiving a second RRC message including second information indicating reduction of the number of physical downlink control channel candidates that the terminal device is able to simultaneously monitor for the downlink cell, the number of physical downlink control channel candidates for a UE specific search space (USS) is reduced based on the second information.

6. An integrated circuit mountable on a base station device configured to communicate with a terminal device, the integrated circuit causing the base) station device to perform at least:
transmitting
a first Radio Resource Control (RRC) message including first information indicating that more than five cells are configured, and
a plurality of Downlink Control Information (DCI) with a DCI format 1A being used for scheduling of one Physical Downlink Shared Channel (PDSCH) in one cell, the DCI being corresponding to each of the cells; and
transmitting physical downlink control channel candidates based on the DCI for the downlink cell, wherein
in a case of transmitting a second RRC message including second information indicating reduction of the number of physical downlink control channel candidates that the terminal device is able to simultaneously monitor for the downlink cell, the number of physical downlink control channel candidates for a UE specific search space (USS) is reduced based on the second information.

* * * * *